(12) United States Patent
Decoster et al.

(10) Patent No.: US 11,517,844 B2
(45) Date of Patent: Dec. 6, 2022

(54) AIR FILTER ELEMENT AND METHOD FOR PRODUCING SAME

(71) Applicant: Donaldson Company, Inc., Bloomington, MN (US)

(72) Inventors: Kristof Decoster, Minneapolis, MN (US); Johnny Craessaerts, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 300 days.

(21) Appl. No.: 16/344,673

(22) PCT Filed: Oct. 24, 2017

(86) PCT No.: PCT/US2017/058119
§ 371 (c)(1),
(2) Date: Apr. 24, 2019

(87) PCT Pub. No.: WO2018/081148
PCT Pub. Date: May 3, 2018

(65) Prior Publication Data
US 2020/0054982 A1   Feb. 20, 2020

(30) Foreign Application Priority Data
Oct. 24, 2016   (EP) .................................... 16195388

(51) Int. Cl.
*B01D 46/52*   (2006.01)
*B01D 46/00*   (2022.01)
(52) U.S. Cl.
CPC ....... *B01D 46/527* (2013.01); *B01D 46/0001* (2013.01); *B01D 46/0005* (2013.01);
(Continued)

(58) Field of Classification Search
CPC .............. B01D 46/527; B01D 46/0001; B01D 46/0005; B01D 2271/027; B01D 2275/206; B01D 2279/60; B01D 46/52; B01D 46/00
(Continued)

(56) References Cited
U.S. PATENT DOCUMENTS 3,025,963 A   3/1962   Bauer
5,895,574 A   4/1999   Friedmann et al.
(Continued)

FOREIGN PATENT DOCUMENTS

CN   1898005   1/2007
CN   1325141   7/2007
(Continued)

OTHER PUBLICATIONS

International Search Report and Written Opinion for PCT/US2017/058119, dated Jan. 19, 2018.
(Continued)

*Primary Examiner* — Robert A Hopkins
*Assistant Examiner* — Qianping He
(74) *Attorney, Agent, or Firm* — Merchant & Gould P.C.

(57) ABSTRACT

The invention pertains to an air filter element comprising: a filter medium pack comprising a filter medium, said filter medium pack having an optionally substantially planar first side and an optionally substantially planar second side, said first side and second side optionally being parallel; and a guiding rim comprising a sealing surface having at least a radially oriented component, arranged on at least one of said first side and said second side, wherein a circumference of the or each guiding rim comprises at least one convex portion and at least one concave portion; and wherein a contour of said filter medium pack corresponds to said convex portion of said guiding rim and at least part of said
(Continued)

concave portion. The invention also pertains to a method for producing an air filter element.

15 Claims, 18 Drawing Sheets

(52) U.S. Cl.
CPC .. *B01D 2271/027* (2013.01); *B01D 2275/206* (2013.01); *B01D 2279/60* (2013.01)

(58) Field of Classification Search
USPC .......................................................... 55/498
See application file for complete search history.

(56) References Cited

U.S. PATENT DOCUMENTS

| | | | |
|---|---|---|---|
| 6,416,605 B1 | 7/2002 | Golden | |
| 8,409,316 B2 | 4/2013 | Nelson et al. | |
| 9,105,361 B2 | 8/2015 | Kim et al. | |
| 9,162,172 B2 | 10/2015 | Nepsund et al. | |
| 2008/0016832 A1* | 1/2008 | Krisko | B01D 46/525 55/342 |
| 2012/0311983 A1* | 12/2012 | Swanson | B01D 46/2411 264/254 |
| 2014/0047808 A1* | 2/2014 | Menssen | B01D 46/525 55/342 |
| 2014/0102057 A1 | 4/2014 | Nepsund et al. | |
| 2014/0174047 A1 | 6/2014 | Croissant | |
| 2015/0101299 A1 | 4/2015 | Osendorf et al. | |
| 2016/0214052 A1* | 7/2016 | Moser | B01D 46/103 |

FOREIGN PATENT DOCUMENTS

| | | | | |
|---|---|---|---|---|
| CN | 1993163 | | 7/2007 | |
| CN | 101405068 | | 4/2009 | |
| CN | 201253524 | | 6/2009 | |
| CN | 102264452 | | 11/2011 | |
| CN | 102302880 | | 1/2012 | |
| CN | 103391801 | | 11/2013 | |
| CN | 104815488 | | 8/2015 | |
| CN | 104955545 | | 9/2015 | |
| CN | 105964059 | | 9/2016 | |
| DE | 3622955 | A1 | 1/1988 | |
| DE | 10309660 | | 9/2004 | |
| DE | 102011011595 | A1 | 8/2012 | |
| DE | 102014016908 | | 5/2015 | |
| DE | 102014016908 | A1 | 5/2015 | |
| DE | 102015016236 | | 7/2016 | |
| DE | 102015016236 | A1 * | 7/2016 | ........... B01D 46/526 |
| DE | 102015016236 | A1 | 7/2016 | |
| EP | 1656982 | | 5/2006 | |
| EP | 1656982 | A1 | 5/2006 | |
| EP | 2140922 | | 1/2010 | |
| EP | 2675547 | A1 | 12/2013 | |
| KR | 10-2011-0025652 | A | 3/2011 | |
| WO | 03095068 | | 11/2003 | |
| WO | 2005063361 | | 7/2005 | |

OTHER PUBLICATIONS

Office Action to Corresponding China Patent Application No. 201780065762.1, dated Mar. 2, 2021.
Indian First Examination Report for Application No. 201917016912 dated May 23, 2021.
Extended Search Report for EP 20075093.0 dated Feb. 1, 2022.

* cited by examiner

1010

1020

1030

US 11,517,844 B2

AIR FILTER ELEMENT AND METHOD FOR PRODUCING SAME

RELATED APPLICATIONS

This application is a National Stage application of PCT International Application No. PCT/US2017/058119, filed Oct. 24, 2017, which claims priority to European Patent Office patent application serial number EP16195388.0 entitled AIR FILTER ELEMENT AND METHOD FOR PRODUCING SAME and filed on Oct. 23, 2016, which applications are incorporated herein by reference. To the extent appropriate, a claim of priority is made to each of the above disclosed applications.

FIELD OF THE INVENTION

The present invention pertains to air filter elements and to methods for producing air filter elements.

BACKGROUND

U.S. Pat. No. 9,162,172 B2 discloses an air cleaner including a housing and an access cover. The internal volume of the housing can be reached through an opening in a side wall of the housing. A filter element having fluted filter media is removable and replaceable from the air cleaner. The housing is constructed and arranged to cam the element into sealing engagement with the housing. A method of installing the filter element in the air cleaner includes sliding a portion of the filter element against a slide surface in the housing. A method of servicing an air cleaner includes tilting the filter element against a tilt surface in the housing to release a seal between the filter element and the housing. The filter element can have a handle to assist in servicing of the air cleaner. The housing can have an inspection window to allow visual inspection of the internal component of the housing and to determine visually whether a filter element is installed therein.

It has been found that the sealing of filter elements of the type disclosed in U.S. Pat. No. 9,162,172 B2 is sometimes unsatisfactory. It has also been found that the generic shape of the housing disclosed in U.S. Pat. No. 9,162,172 B2 may in some cases allow incorrect insertion of filter elements and deliberate or undeliberate replacement of appropriate filter elements by inappropriate filter elements, which may lead to malfunctions of the air filter system and even damage to the systems downstream of the air filter system.

U.S. Pat. No. 9,205,361 B2 discloses an air filter element for an air filter having a tubular filter medium, the annular cross-section of which encloses an interior of the filter element and which has an inner wall that adjoins the interior of the filter element and that extends in the form of at least one convex arch and at least two concave arches, the concave arch being located between two convex arches such that the interior of the filter element has a constriction in the area of the concave arch, the constriction being adjoined by two wide zones of the interior of the filter element. This disclosure is not concerned with fluted filter media, nor with the problems described above in the context of U.S. Pat. No. 9,162,172 B2.

German patent application publication no. DE 10 2015 016236 A1 discloses a filter element comprising a plurality of superimposed blades, that are implemented in an uneven manner and have at least a curvature and are interconnected in their curved state, wherein the axes of curvature are parallel to the flow channels. The filter element of DE 10 2015 016236 A1 does not have a guiding rim with a sealing surface configured to provide radial sealing when installed in the target housing. The filter medium of the filter element of DE 10 2015 016236 A1 does not have a tubular shape.

European patent application publication no. EP 1 656 982 A1 discloses a composite filter construction comprising a first open-cell foamed polyurethane layer, with a middle layer comprising polyester fibers and polypropylene microfibers, a second layer, coupled to the middle layer, comprising a non-woven polypropylene fabric material, and a polyurethane material gasket co-molded on said layers. The filter construction of EP 1 656 982 A1 does not have a guiding rim with a sealing surface configured to provide radial sealing when installed in the target housing. The filter medium of the filter construction of EP 1 656 982 A1 does not have a tubular shape.

German patent application publication no. DE 10 2014 016908 A1 discloses in FIGS. 8 and 9 a filter element for fluids, in particular of an internal combustion engine, in particular of a motor vehicle, comprising a filter bellows made of a filter medium, which filter medium is placed in the filter bellows along folded edges, in particular in a zig-zag shape, in folds, which extend between opposite face edges of the filter bellows, wherein a face fold having a folded edge and an opposite free face border is arranged on each opposite end face of the filter bellows and at least two folded edges that are consecutive along a face edge of a fold end at opposite surfaces of the filter bellows, wherein at least a segment of one of the face edges extends at an angle to at least one of the folded edges in such a way that, in said segment, the folded edges on the one surface have a different length than the folded edges of the other surface and wherein the folds are laterally sealed by the face edges. The cited embodiments do not have a guiding rim with a sealing surface configured to provide radial sealing when installed in the target housing. The filter medium of these embodiments does not have a tubular shape.

European patent application publication no. EP 2 675 547 A1 discloses an air filter system including a filter housing with a filter element received within the housing. The filter element comprises a pleated filter medium. A secondary housing is secured to and closing the filter housing. The secondary housing includes a locking element operable to engage the filter housing and the filter element. The filter element includes at least one fastening element wherein the locking element of the secondary housing engages the at least one fastening element in such a way, when the filter element is accommodated in the filter housing and is disposed between the filter housing and the secondary housing, that the secondary housing is detachably clamped to the filter housing. This document does not disclose a guiding rim comprising a sealing surface having at least a radially oriented component.

SUMMARY

It is an object of embodiments of the present invention to provide a filter element with improved sealing characteristics. It is a further object of embodiments of the present invention to reduce the risk of incorrect installation of filter elements in filter systems.

According to an aspect of the present invention, there is provided an air filter element comprising: a filter medium pack comprising a filter medium, the filter medium pack having a first and second side, which can be optionally arranged as a substantially planar first side and a substantially planar second side, the first side and second side can optionally be parallel; and a guiding rim comprising a sealing surface having at least a radially oriented component, arranged on at least one of the first side and the second side; wherein a circumference of the or each guiding rim comprises at least one convex portion and at least one concave portion; and wherein a contour of the filter medium pack corresponds to the convex portion of the guiding rim and at least part of the concave portion.

The present invention is based inter alia on the insight of the inventors that by providing the filter element with a guiding rim that has a sufficiently curved circumference, in particular a circumference with at least one convex portion and at least one concave portion, a more reliable seal can be obtained than when the seal is to be formed along substantially straight lines. The guiding rim comprises a sealing surface having at least a radially oriented component; in particular, the guiding rim may comprise a radially directed seal (also referred to as radial seal).

The present invention is also based on the further insight of the inventors that by providing the filter element with a guiding rim whose circumference has at least one convex portion and at least one concave portion, the overall symmetry of the filter element may be reduced, thus reducing the possibilities for incorrect installation of the filter element in the housing.

The present invention is also based on the further insight of the inventors that by having a filter medium pack whose contour corresponds to the circumference of the guiding rim at least in the convex portions, the space defined by the guiding rim(s) is optimally used to provide filtering capacity. The term "corresponds to" is used herein to indicate that the shape of the filter medium pack closely follows the shape of the guiding rim; the distance between the contour of the filter medium pack and the guiding rim is relatively small and does not vary considerably along the contour. Along the convex portion of the periphery, the guiding rim preferably stays within a distance of 2 cm, more preferably within 1 cm, and most preferably within 0.5 cm, of the contour of the filter medium pack. Along said convex portion of the periphery, the distance between the guiding rim and the contour of the filter medium pack preferably does not vary more than 2 cm, more preferably not more than 1 cm, most preferably not more than 0.5 cm. Optionally, the periphery of the guiding rim may correspond to the contour of the filter medium pack over its entire length, i.e. not only over the convex portion.

It is a further advantage of a filter medium pack with a contour that has a concave portion, that the hollow space thus created is a very suitable for the placement of a handle to facilitate installing or removing the filter element.

The sealing surface having at least a radially oriented component is preferably configured to provide radial sealing when installed in a suitably shaped cavity.

The filter medium pack preferably has a tubular shape. The term "substantially tubular" is used to cover shapes obtained by rolling a length of filter medium (with or without a core or a hollow space at the center), shapes obtained by arranging pleated filter media as a tube, and shapes obtained by combining multiple units that are substantially tubular in the aforementioned sense. The substantially tubular shape may include one or more pinches and/or bends.

In an embodiment of the air filter element according to the present invention, the filter medium pack comprises a rolled-up length of filter medium having a tubular shape and a core that is substantially geometrically similar to the contour.

It is an advantage of this embodiment that relatively complex contours can be obtained by rolling up filter media around a judiciously designed core. The filter media may be rolled up around a winding core, removed from the winding core, and then provided with a final core. Alternatively, the filter media may be rolled up around a core that remains in place in the final product. It is a further advantage of this embodiment that it provides increased rigidity. The term "geometrically similar" is used herein to designate an object of the same general shape, but at a different scale. The term "substantially geometrically similar" is used to indicate that the similarity of the shapes of the core and the guiding rim need not be exact, but is sufficiently strong for the core to determine the shape of the resulting rolled-up pack.

In an embodiment of the air filter element according to the present invention, the filter medium pack comprises z-type filter media.

In arrangements of this type, the inlet surface and the outlet surface of the filter media are the parallel substantially planar sides, where the ends of the "flutes" of the media are aligned.

In an embodiment of the air filter element according to the present invention, the filter medium pack comprises pleated filter media arranged in a tubular shape.

In arrangements of this type, the inlet surface and the outlet surface of the filter media are usually the inner mantle of the bore of the tubular shape and the outer mantle of the tubular shape, or vice versa. While the filter medium pack has a substantially planar first side and a substantially planar second side, the first side and second side being parallel, as described above, the pleated filter media may be arranged within this filter medium pack in a different shape, such as a W-shape.

In an embodiment of the air filter element according to the present invention, the contour is elongate and at least one concave portion is present along a longitudinal side of the contour. More particularly, the contour may be essentially bean-shaped or kidney-shaped. The filter element is then of the bean-shape type or kidney-shape-type.

It is an advantage of this embodiment that a degree of asymmetry can be introduced in the design with minimal added complexity.

In an embodiment of the air filter element according to the present invention, the filter medium pack comprises at least two separately rolled-up lengths of filter medium, the at least two separately rolled-up lengths of filter medium being held together by the guiding rim. More particularly, the contour may be essentially 8-shaped. The filter element is then of the 8-shape-or lemniscate type.

This embodiment is based inter alia on the insight of the inventors that the filter medium pack may advantageously be 8-shaped or the like. It is an advantage of this embodiment that the individual rolls can be cylindrical and can be obtained simply by rolling up a sheet of medium around a cylindrical core or onto itself, while the combination of several rolls still results in the desired contour having a concave part and a convex part. Each of the at least two separately rolled-up lengths of filter medium may comprise a cylindrical core (the winding core onto which it was wound, or a different core inserted after removing the roll from the winding core), or it may be coreless.

In an embodiment of the air filter element according to the present invention, the filter medium pack is rolled up so as not to leave a hollow space at its center.

In an embodiment, the filter medium pack is rolled or coiled such that the filter medium pack is without a hollow space at its center.

As filter medium packs consisting of certain types of filter media, such as fluted or z-type filter media, do not require a tubular shape in order to supply or withdraw air from the hollow center (as is the case in the pleated-medium examples disclosed in U.S. Pat. No. 9,205,361 B2, cited above), the filter medium pack may advantageously be filled up entirely with filter medium, thus increasing the filtering capacity for a given housing volume. Such a "full" filter medium pack may be obtained by rolling up the filter medium around a removable winding core, and flattening it after taking it off the roll. Alternatively, such a "full" filter medium pack may be obtained by rolling a sheet of filter medium sheet onto itself.

According to an aspect of the present invention, there is provided an air filter system comprising a housing and an air filter element with an essentially bean-shaped or kidney-shaped contour as described above, the housing defining a cavity shaped so as to be able to hold the air filter element; wherein the housing comprises an access window for inserting the air filter element into said cavity and removing the air filter element from the cavity; and wherein the access window is shaped and positioned in such a way that the air filter element can be inserted and removed by a movement that comprises a rotation.

It is a particular advantage of filter elements having "bean shaped" or "kidney shaped" contours that the filter system may occupy an available space in a system which would not otherwise be able to hold a traditionally-shaped filter system (in particular, a cavity with a bend or corner). Moreover, the air filter elements may be introduced and removed in a non-axial direction. Also, the air filter elements may be moved towards or away from the housing along a path between obstacles, such as the pre-arranged components of an engine or machine, which would not have been possible with a standard straight shaped filter element.

In such cases, the housing may be adapted to introduce and remove the filter element from the side (i.e., transversally rather than axially in the direction of flow of the air to be filtered), in which case a relatively small side opening may suffice to allow the filter element to slide rotatingly into or out of the housing. The rotational movement allows the bean-shaped or kidney-shaped air filter element to turn "around the corner" during installation of removal. Such a corner may be present because the housing may have to be arranged in a part of a machine or engine system where the presence of other essential components leaves no room for a large, straight filter cavity. The bean-shaped or kidney-shaped air filter element can bend around an obstacle, and still be inserted or removed relatively easily. Accordingly, obstacles such as components of a predetermined engine arrangement (e.g., the arrangement of engine components under the hood of an automobile or a truck) may be present in the space defined by the concave portion of the filter medium pack contour during the insertion or removal trajectory of the latter. In some embodiments, the access window is shaped and positioned in such a way that, taking into account the shape of the air filter element, the air filter element can only be inserted and removed by a movement that comprises a rotation, e.g. following the curvature of the contour. More complex shapes, having two or more concave portions along the contour of the filter medium pack, may be used to allow the filter element to travel past more complex combinations of obstacles.

The sealing surface of the air filter element preferably provides radial sealing against the housing. In some examples, the sealing surface faces away from a longitudinal axis of the filter element and can thus be characterized as an outwardly facing seal or as an outwardly directed radial seal.

According to an aspect of the present invention, there is provided a method for producing an air filter element, the method comprising: rolling up at least one length of filter medium having a constant width, to produce a filter medium pack with a substantially planar first side and a substantially planar second side, the first side and second side being parallel; and arranging a guiding rim comprising a sealing surface having at least a radial component on at least one of the first side and the second side; wherein a circumference of the or each guiding rim comprises at least a convex portion and at least a concave portion; and wherein a contour of the filter medium pack corresponds to the convex portion of the guiding rim and at least part of the concave portion.

The filter medium preferably has a substantially tubular shape. The sealing surface is preferably configured to provide radial sealing when installed in a suitably shaped cavity.

In an embodiment of the method according to the present invention, the rolling up comprises rolling the length of filter medium around a core having a shape that is substantially geometrically similar to the circumference.

In a particular embodiment, the contour is elongate and at least one concave portion is present along a longitudinal side of the contour. More particularly, the contour may be essentially bean-shaped or kidney-shaped.

In an embodiment of the method according to the present invention, the rolling up comprises separately rolling up at least two rolled-up lengths of filter medium around respective cylindrical cores, and joining the two separately rolled-up lengths of filter medium being together by the arranging of the guiding rim. More particularly, the contour may be essentially 8-shaped.

In an embodiment of the method according to the present invention, the rolling up comprises rolling the length of filter medium around a core, the method further comprising removing the core from the filter medium pack and deforming the filter medium pack to obtain the contour.

In an embodiment, an air filter element is provided with a filter medium pack, a first guiding rim, and a seal portion. The filter medium pack can be formed from coiled fluted filter media and can have an outer circumference defining a convex portion and a concave portion. The first guiding rim can be mounted to a first end of the filter medium pack. The first guiding rim can also define a convex portion corresponding to the filter medium pack convex portion and a concave portion corresponding to the filter medium pack concave portion. The seal portion can be supported by the first guiding rim and can define an outwardly directed radial sealing surface. The first guiding rim can also define concave and convex portions.

In an embodiment, a second guiding rim mounted to a second end of the filter medium pack.

In an embodiment, the first guiding rim and the filter medium pack each have two convex portions and two concave portions.

In an embodiment, the filter medium pack further includes a central core.

In an embodiment, the filter medium pack has a cross-sectional shape characterized as one of a kidney-shape, a bean-shape, a lemniscate or 8-shape, an S-shape, and a W-shape.

The technical effects and advantages of embodiments of the method according to the present invention correspond mutatis mutandis to those of the corresponding embodiments of the filter element according to the present invention.

BRIEF DESCRIPTION OF THE FIGURES

These and other features and advantages of embodiments of the present invention will be described in more detail with reference to the attached drawings, in which:

FIG. 1b presents a cross-sectional view of the filter element shown in FIG. 1, taken along the line A-A in FIG. 1a.

FIG. 5b presents a cross-sectional view of the filter element shown in FIG. 5, taken along the line A-A in FIG. 5a;

FIG. 7b presents a cross-sectional view of the filter element shown in FIG. 7, taken along the line A-A in FIG. 7a;

FIG. 9b presents a cross-sectional view of the filter element shown in FIG. 9, taken along the line A-A in FIG. 9a;

DESCRIPTION OF EMBODIMENTS

A first embodiment of the filter element according to the present invention will now be described with reference to FIGS. 1-4.

Figure 1:
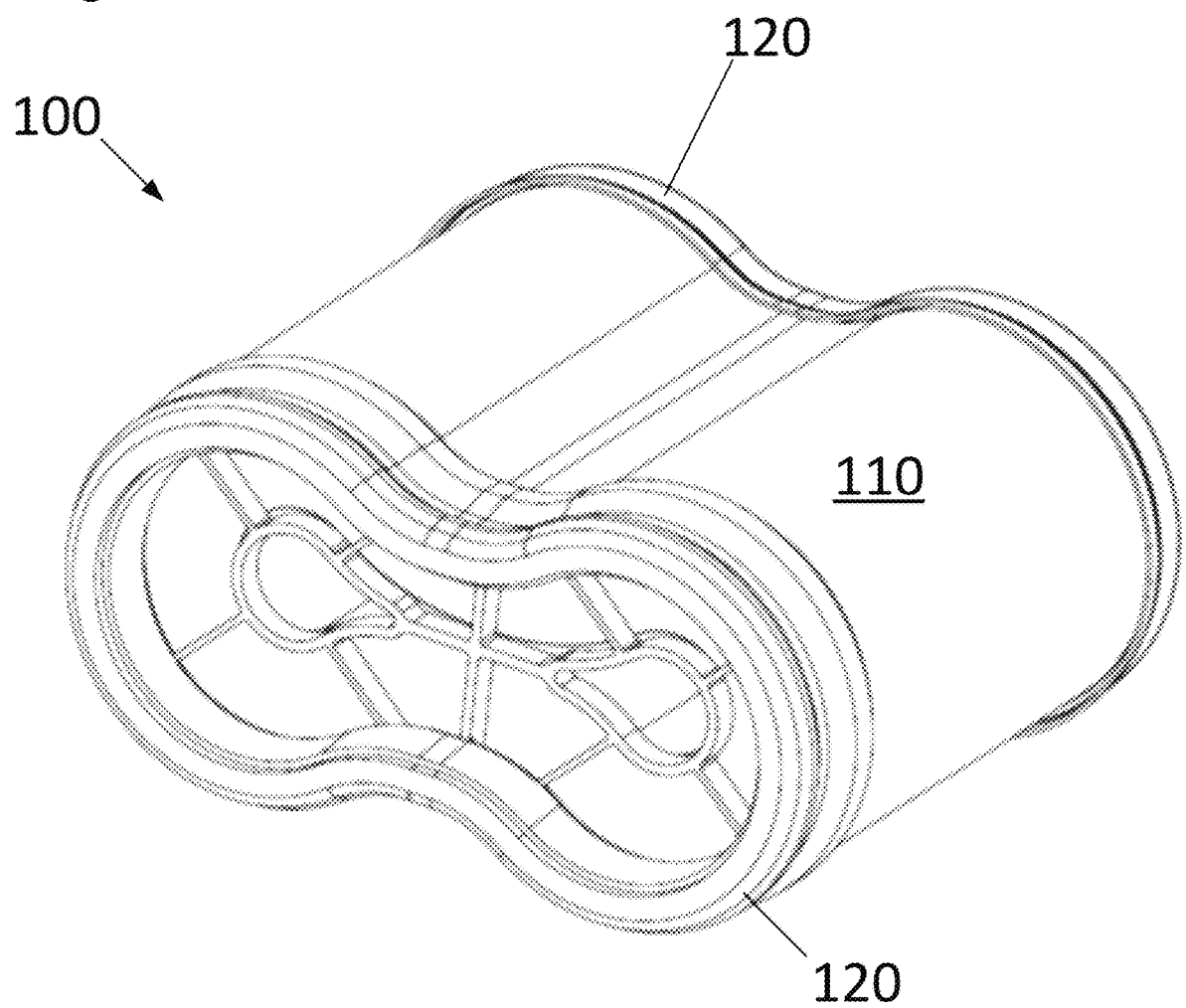
FIG. 1 presents a perspective view of a filter element according to a first embodiment of the present invention.
Figure 1A:
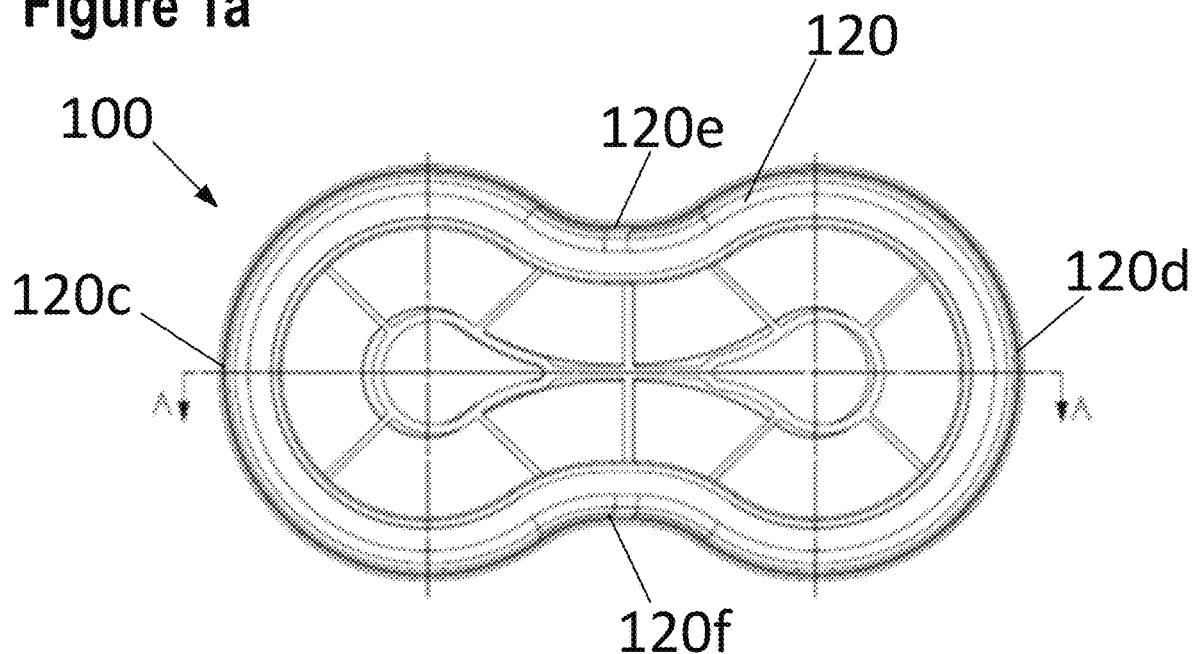
FIG. 1a presents an end view of the filter element shown in FIG. 1.
Figure 1B:
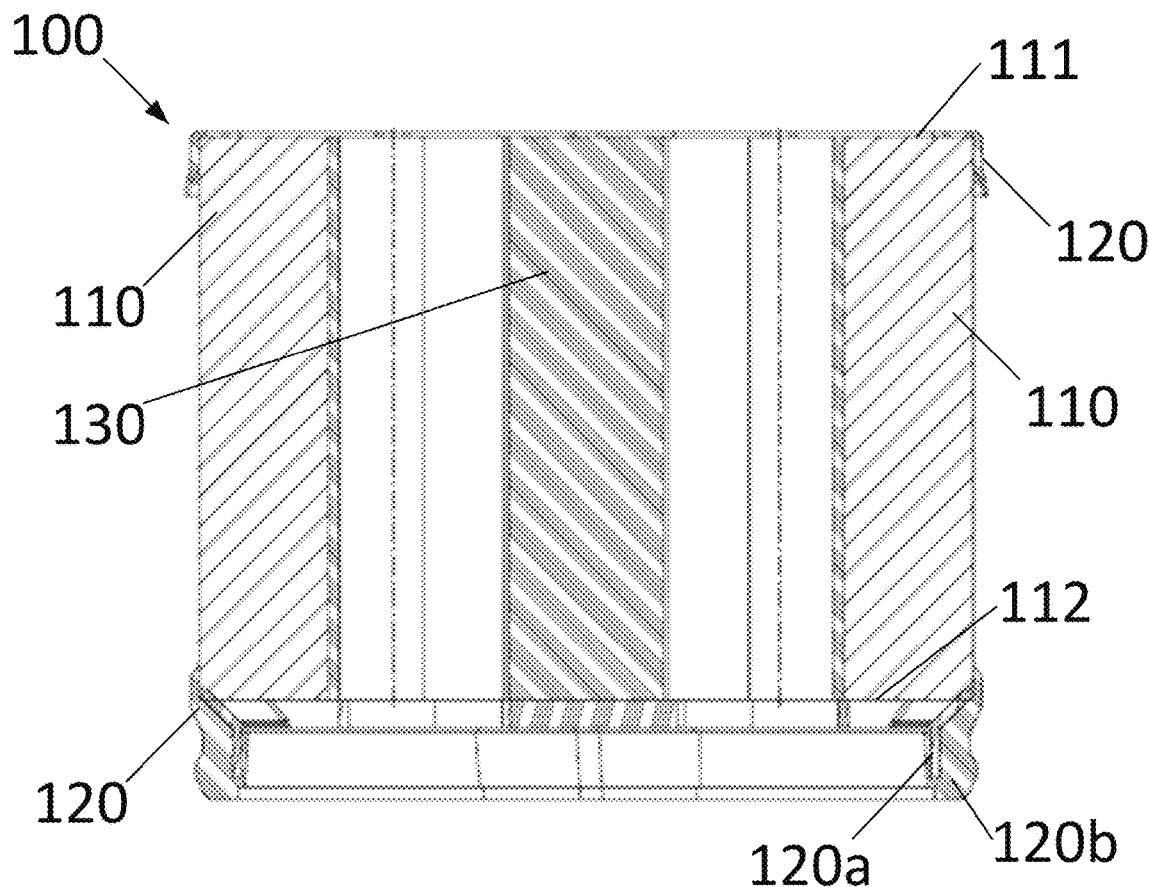

FIGS. 1-1b respectively present a plan view (top left), a cross section (bottom left), and a perspective view (right) of this embodiment.

The illustrated air filter element 100 comprises a filter medium pack 110 comprising a rolled-up length of filter medium. The filter medium pack 110 has a substantially planar first side 111 and a substantially planar second side 112, which are parallel to each other. The air filter element 100 is intended to be removably installed in a housing (not shown). To allow insertion or removal of the air filter element 100, the housing has one or more openings or "windows." Various housing and window arrangements are possible, including systems where the opening is accessed by removing the end of the housing where the inlet or the outlet is provided, and systems where a window on the side of the housing can be accessed. For filter medium pack designs that have an elongate contour, the "side loaders" may have their window on the narrow side or on the broad side.

The present invention may be implemented with different kinds of filter media, including pleated filter media and fluted filter media. Various types of pleated filter media are commercially available and known to the skilled person. Fluted filter media includes filter material having a plurality of flutes formed therein having alternating ends of adjacent flutes closed to force fluid through filter material. Various types of fluted filter media are commercially available and known to the skilled person.

A filter medium pack of the fluted filter media type or z-type media is known to the skilled person. For example, some types of fluted filter media are known from U.S. Pat. No. 3,025,963 to Jordan V. Bauer, U.S. Pat. No. 5,895,574 to Francis Friedmann et al., U.S. Pat. No. 6,416,605 to Patrick Golden, and from US patent application publication no. US 2014/0102057 A1. The entireties of each of the US '574 patent, the US '605 patent, and the US '057 publication are incorporated by reference herein in their entireties. A filter medium pack 110 of the fluted filter media type may for instance be obtained by rolling up a base sheet comprising generally parallel hollow tubes (flutes, original tubes) and applying a sealing adhesive between the consecutive layers of rolled-up filter medium, for instance at the side of the open ends. The base sheet can for instance be composed of a flat sheet of media and an undulated sheet of media, which are attached to each other. First axial ends of the hollow tubes are abutting a first substantially planar side 111 of the filter medium pack 110 and second axial ends of the hollow tubes are abutting a second substantially planar side 112 of the filter medium pack 110. Complementary spaces/tubes can be created in between the hollow tubes when rolling up the base sheets, and are being defined in between the undulated sheet of a certain winding and the flat sheet of its subsequent winding.

The hollow tubes and the complementary spaces/tubes can be interrupted at appropriate locations such as to force air coming in in a first tube (e.g. an original tube) at its first axial end (at the first planar side 111) to pass through the sidewall of the first tube into one or more adjacent second tubes (e.g. complementary tube(s)), the air thereafter forcing to leave the second tube(s) at the second axial end of the second tube(s) (at the second planar side 112). Some of these interruptions may be provided initially with the original tubes (e.g. closed at their second axial end), others may be provided for instance by applying the sealing adhesive (e.g. for complementary tubes, preferably near their first axial ends). The ends 111, 112 then serve as outlet and inlet surfaces of the filter. When the filter element 100 is installed in the housing of the filter system of which it forms a part, air is supplied to the inlet surface, preferably but not necessarily, via a precleaning filter which may comprise a number of cyclones, and withdrawn from the outlet surface.

Likewise, other types of filter medium pack 110 may be obtained by including a step of rolling up a medium that is provided in the form of a sheet.

The air filter element 100 further comprises a guiding rim 120 arranged on at least one of said first side 111 and said second side 112. Preferably, guiding rims 120 are present on both sides 111, 112, as in the illustrated case. At least one such guiding rim 120 comprises a radially oriented sealing surface or a sealing surface having at least a radially oriented component, for example an outwardly directed radially oriented component. In addition, it may have an axial component. It may be provided with a gasket, acting as a radial seal or an axial seal with at least a radial component.

Guiding rims 120 provide the sealing surface which allows the filter element 100 to sealingly engage with the inlet and/or outlet orifices of the filter system. In addition, they may contribute to the structural rigidity of the filter element 100, and they can assist the operator in correctly positioning the filter element 100 in the filter system (by virtue of their shape, and optionally by means of added guiding elements such as protrusions, grooves, tabs, and the like).

The guiding rims 120 may comprise a rigid plastic material 120a (which may for instance be a supporting structure) such as but not only polyethylene or polypropylene, with a separate seal or gasket 120b made of for instance a suitable elastomer, or polyurethane arranged on their sealing surface. Alternatively, the guiding rims 120 may be made of a material that can serve as a seal, in particular a suitable elastomer such as polyurethane.

Guiding rims 120 may be separately manufactured and attached to the filter medium pack 110, or they may be molded in place (i.e. overmolded onto the filter medium pack 110) if the melting and curing properties of the chosen material allow this.

In the illustrated case, the air filter as seen in the plan view has an elongate shape. The circumference of each guiding rim 120 comprises at least one convex portion and at least one concave portion. With reference to the orientation of the plan view for the present purpose, it can clearly be seen in the illustrated case that the left-hand side 120c and the right-hand side 120d of the contour are convex (viewed from the outside of the filter element) while the top side 120e and the bottom side 120f of the contour (the longitudinal sides) comprise a concave central portion 120e, 120f. In the illustrated case, the contour of the filter medium pack 110 (as seen in cross-section in any plane parallel to the planar sides 111, 112) corresponds to (i.e., it closely matches) the entire circumference of the guiding rim 120.

Figure 2:
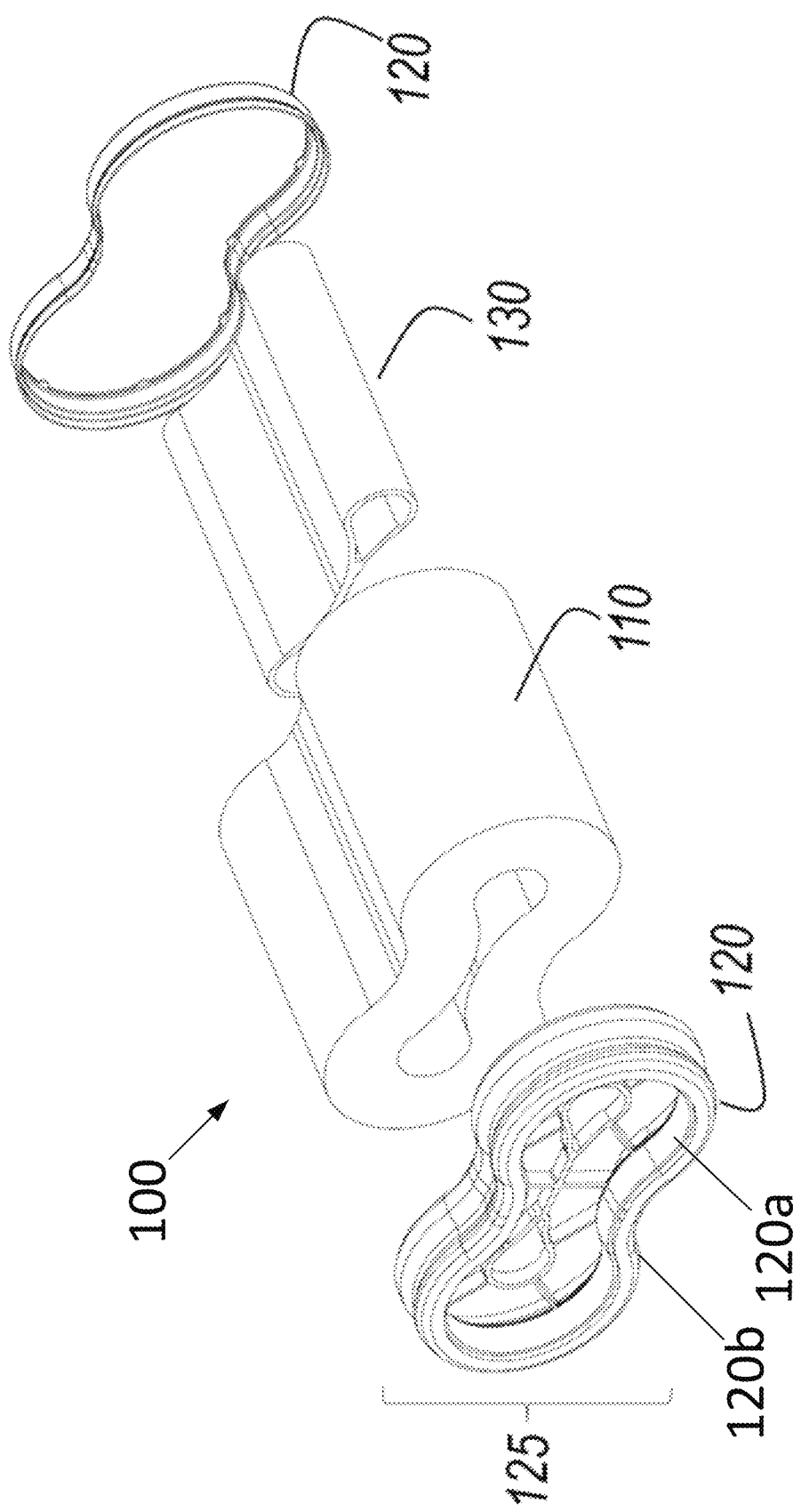
FIG. 2 presents an exploded view of the filter element according to the embodiment of FIG. 1.

FIG. 2 presents an exploded view of the filter element according to the first embodiment. The filter medium pack 110 has a tubular shape, i.e. its shape closes onto itself around a hollow center, and comprises a core 130 that is substantially geometrically similar to the outer contour of the filter medium pack 110. FIG. 2 shows the guiding rims 120 on each side of the filter medium 110 and the core 130 to be placed at the center of the filter medium 110. The guiding rims may be comprised in an element 125 that covers part of the relevant side 111 or 112, for example to avoid telescopic deformation of the rolled up filter medium pack 110; to increase structural rigidity, the element 125 may also help to keep the core 130 in place.

Figure 3:
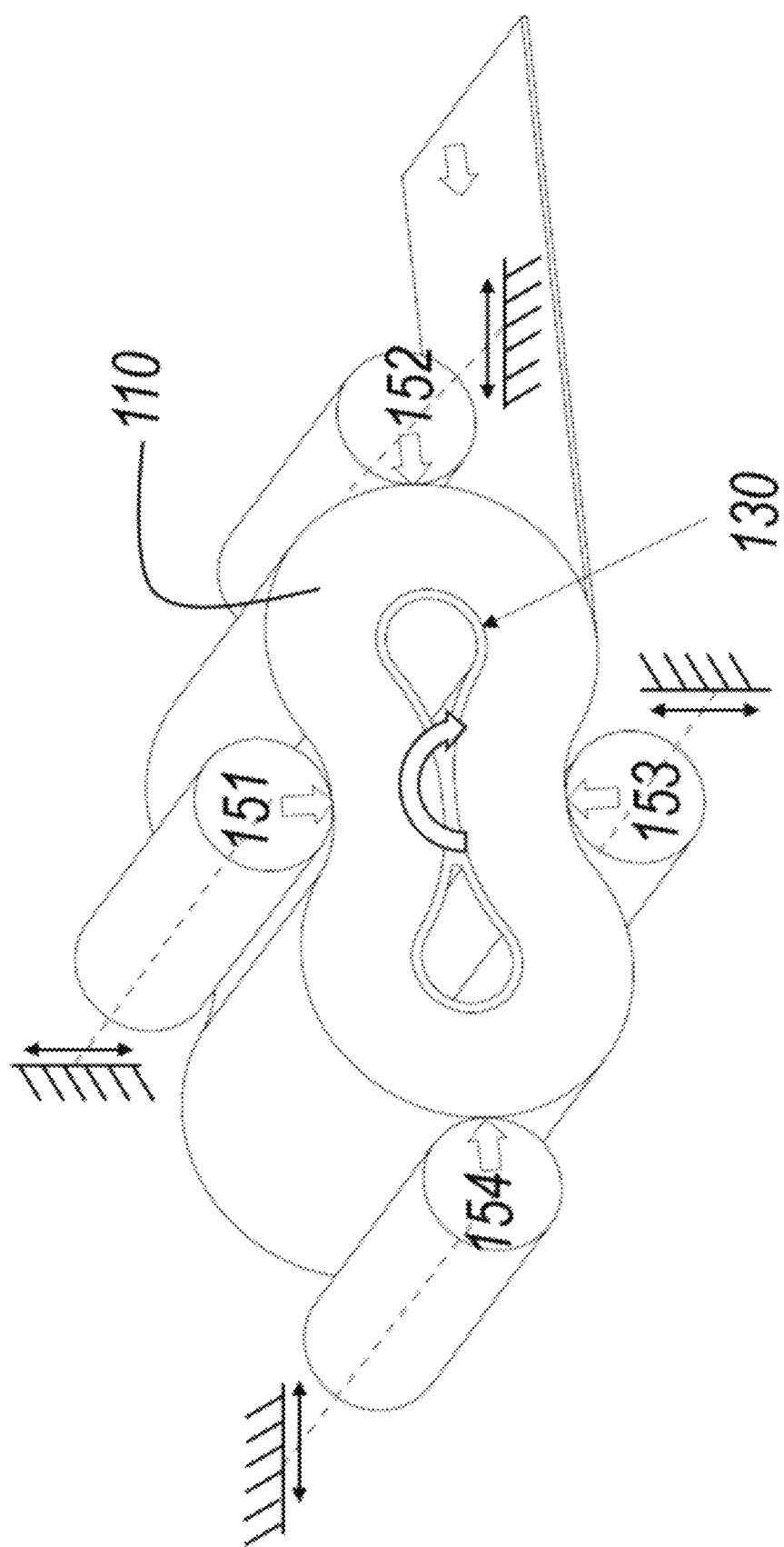
FIG. 3 schematically illustrates a first method of producing the filter element according to the embodiment of FIG. 1.

FIG. 3 schematically illustrates a first method of producing the filter element 100 according to the first embodiment. The method comprises rolling up a length of filter medium having a constant width, to produce a filter medium pack 110 with a substantially planar first side 111 and a substantially planar second side 112, the first side 111 and second side 112 being parallel. The rolling up comprises rolling the length of filter medium around a core 130 having a shape that is substantially geometrically similar to the desired circumference. In order to achieve a sufficiently tight winding, the sheet is kept under appropriate tension and pressed onto the core 130 and subsequently onto the increasing pack by suitably arranged reciprocating rollers 151-154. Adhesive (not shown) is applied to the sheet to keep the consecutive layers together.

Once a filter medium pack 110 of the desired shape and size has been obtained, a guiding rim 120 as described above is arranged on at least one of the first side 111 and the second side 112 (not illustrated in FIG. 3).

Figure 4:
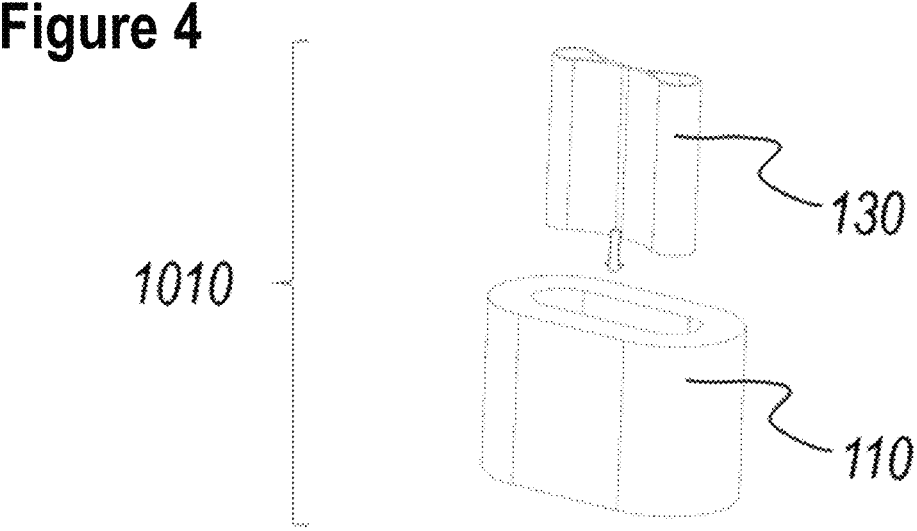
FIGS. 4-4b schematically illustrates a second method of producing the filter element according to the embodiment of FIG. 1.
Figure 4A:
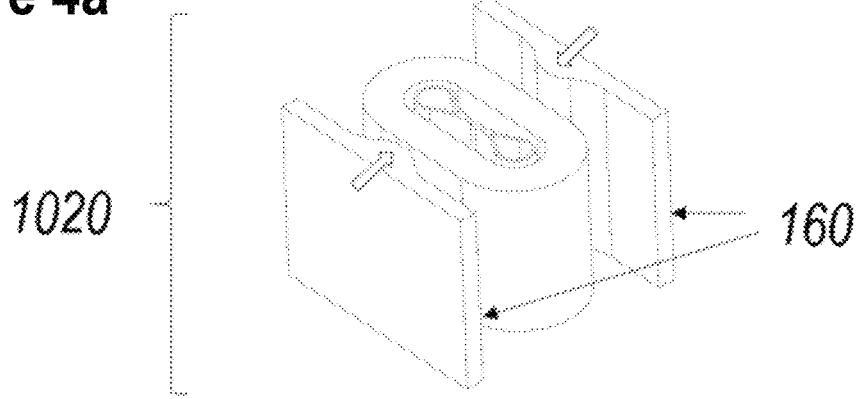
Figure 4B:
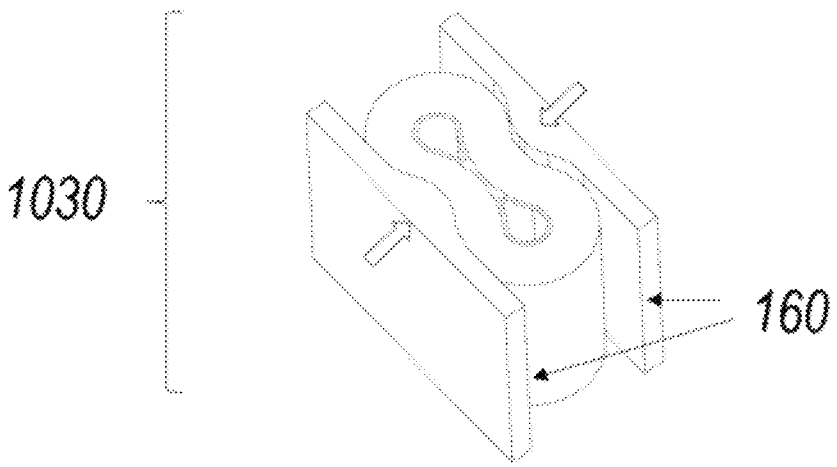

FIGS. 4-4b schematically illustrate a second method of producing the filter element according to the first embodiment.

In a preliminary step (not illustrated), a length of filter medium having a constant width is rolled up around an oval or obround winding core, to produce a filter medium pack 110 with a substantially planar first side 111 and a substantially planar second side 112, the first side 111 and second side 112 being parallel. As the winding core is oval or obround the tensioning and pressing of the filter medium sheet is less complex than in the case illustrated in FIG. 3. During the winding operation, adhesive is applied to the sheet to keep the consecutive layers together. After removal from the winding core, the resulting filter medium pack 110 has an elongate shape without concave portions, and a hollow center.

In a first step 1010, a core 130 that represents the desired contour shape by being substantially geometrically similar to it is inserted into the said hollow center of the filter medium pack 110. In a second step 1020 the filter medium pack 110 with the core 130 is placed into an appropriately shaped press-mold 160, which has protrusions corresponding to the desired concave portions of the contour. In a third step 1030, the press-mold 160, is closed to force the filter medium pack 110 into the desired shape. As this deformation inevitably causes some sliding of the layers of filter medium in the filter medium pack 110, this step preferably should be completed before the applied adhesive has completely cured.

In a subsequent step (not illustrated), a guiding rim 120 as described above is arranged on at least one of the first side 111 and the second side 112.

A second embodiment of the filter element according to the present invention will now be described with reference to FIGS. 5 and 6. This embodiment will be described with emphasis on the elements that differ from those of the first embodiment.

Figure 5:
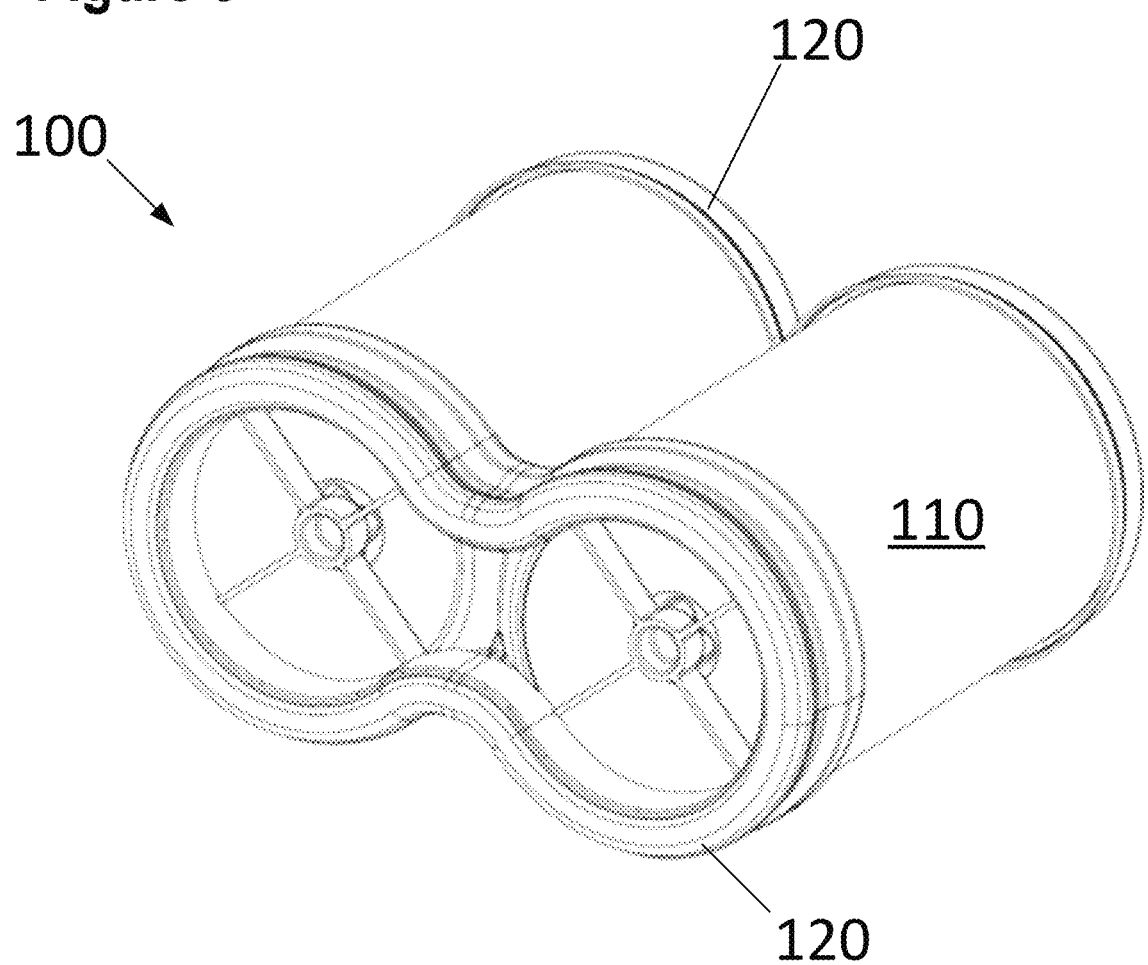
FIG. 5 presents a perspective view of a filter element according to a second embodiment of the present invention.
Figure 5A:
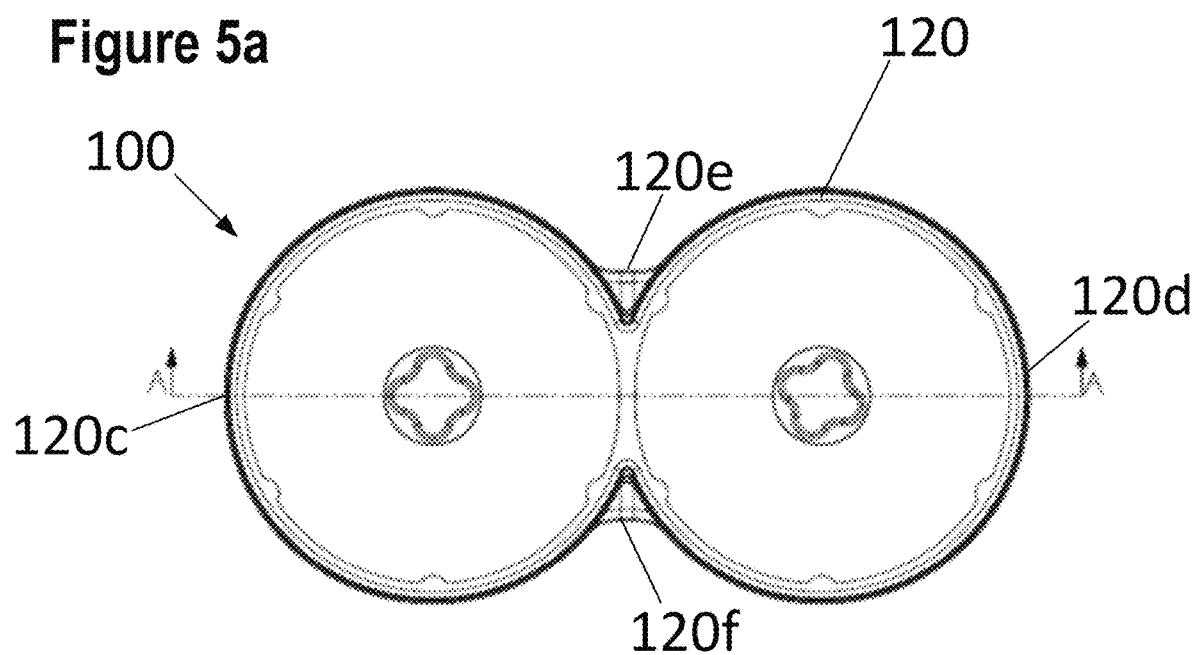
FIG. 5a presents an end view of the filter element shown in FIG. 5.
Figure 5B:
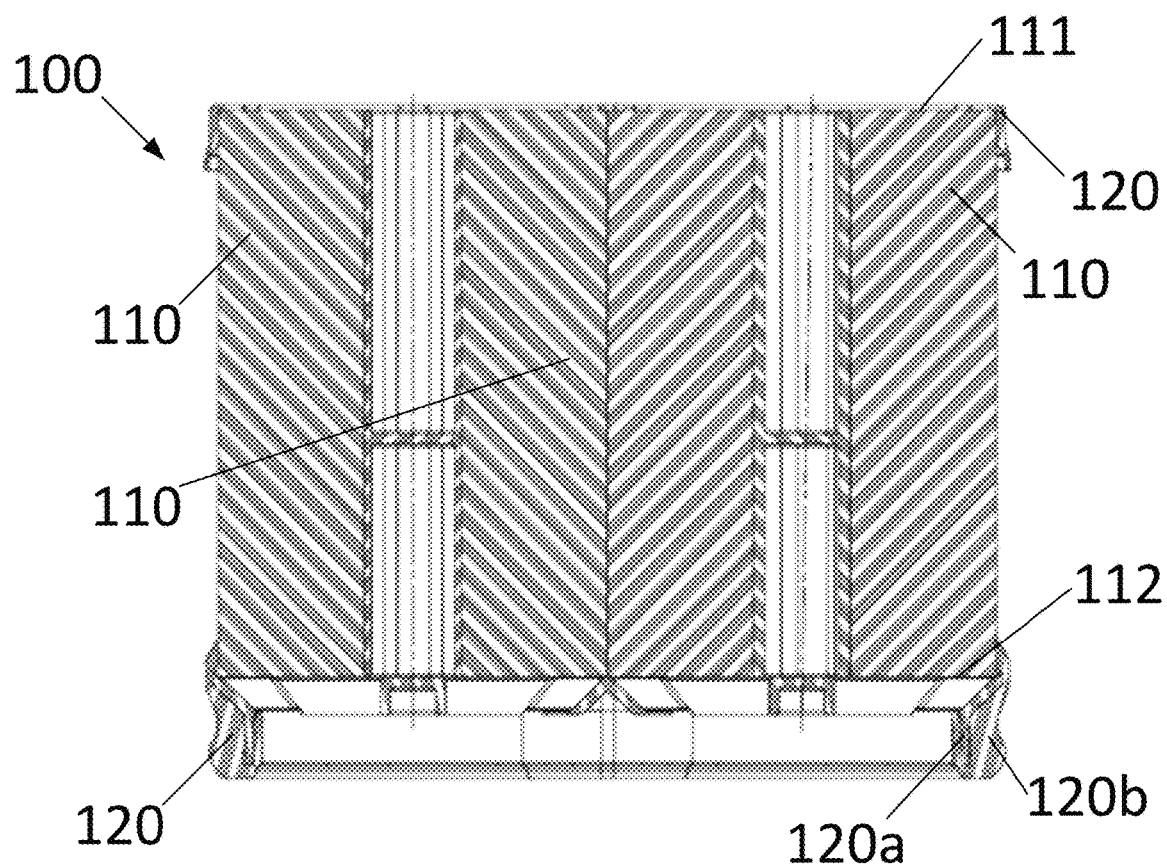

FIGS. 5-5*b* present a plan view (top left), a cross section (bottom left), and a perspective view (right) of this embodiment.

The illustrated air filter element 100 comprises a filter medium pack 110 comprising two separately rolled-up lengths of filter medium. The resulting filter medium pack 110 has a substantially planar first side 111 and a substantially planar second side 112, which are parallel to each other. As before, the filter medium is preferably of the "fluted filter media" type.

The air filter element 100 further comprises a guiding rim 120 arranged on at least one of said first side 111 and said second side 112. Preferably, guiding rims 120 are present on both sides 111, 112, as in the illustrated case. As the illustrated filter medium pack 110 consists of two separately rolled-up lengths of filter medium, the guiding rim 120 has the additional function of keeping these two rolls together to form one pack.

In the illustrated case, the air filter element 100 has an elongate shape. The circumference of each guiding rim 120 comprises at least one convex portion and at least one concave portion. With reference to the orientation of the plan view for the present purpose, it can clearly be seen in the illustrated case that the left-hand side 120*c* and the right-hand side 120*d* of the contour are convex (viewed from the outside of the filter element) while the top side 120*e* and the bottom side 120*f* of the contour (the longitudinal sides) comprise a concave central portion 120*e*, 120*f*. In the illustrated case, the contour of the filter medium pack 110 corresponds to (i.e., it closely matches) the convex portion of the circumference of the guiding rim 120. However, as the concave portions 120*e*, 120*f* are situated where the two rolls of media meet each other, the contour of the filter medium pack 110 does not strictly follow the circumference of the guiding rim 120 in these portions.

Figure 6:
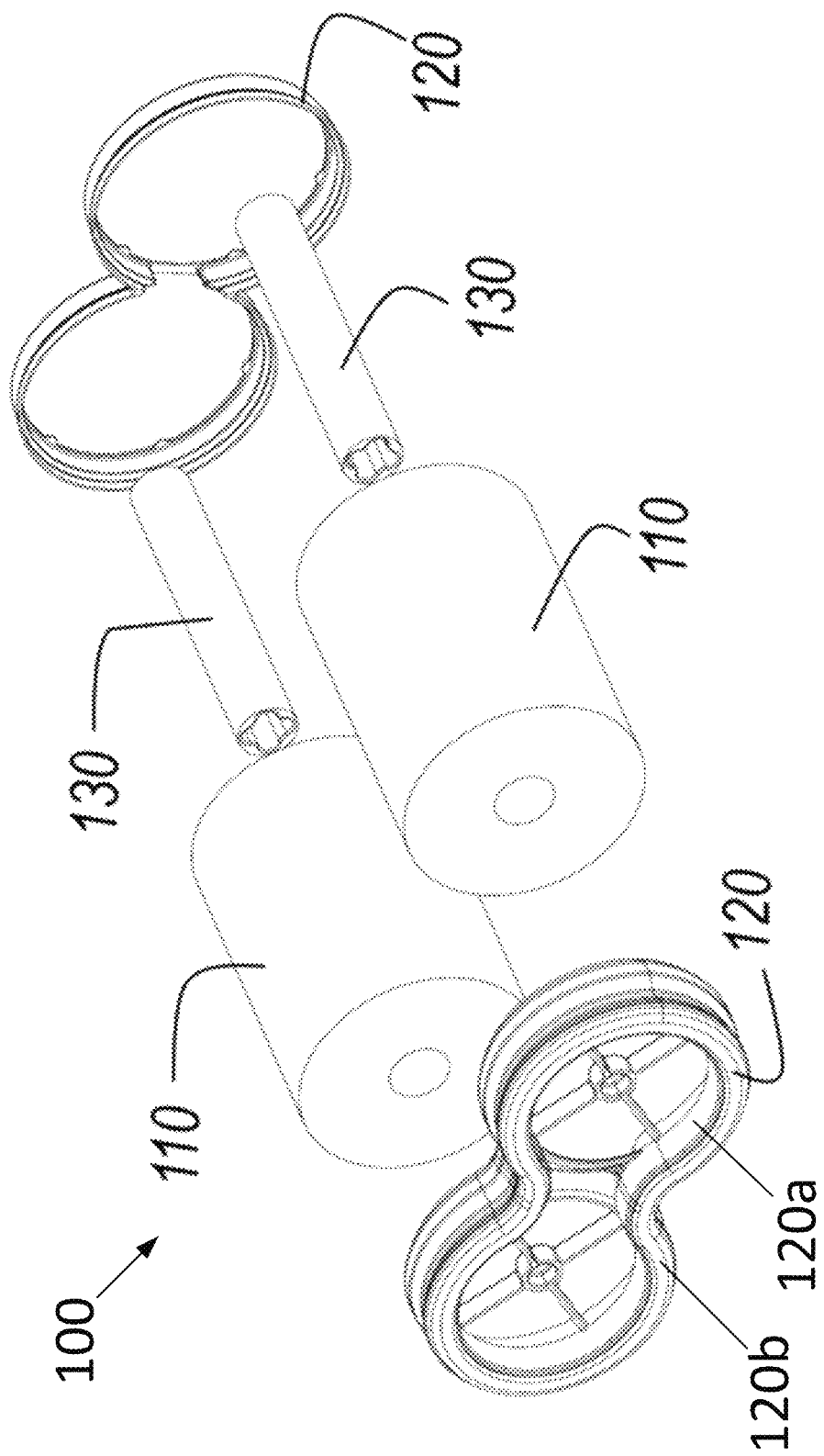
FIG. 6 presents an exploded view of the filter element according to the embodiment of FIG. 5.

FIG. 6 presents an exploded view of the filter element according to the second embodiment. The filter medium pack 110 consists of two tubular cylinders, i.e. cylinders with a hollow center, and comprises corresponding cylindrical cores 130. FIG. 6 also shows the guiding rims 120 on each side of the filter medium 110 that keeps the rolls of filter medium 110 together and the cores 130 to be placed at the center of the rolls of filter medium 110.

A third embodiment of the filter element according to the present invention will now be described with reference to FIGS. 7 to 8. This embodiment will be described with emphasis on the elements that differ from those of the first embodiment.

Figure 7:
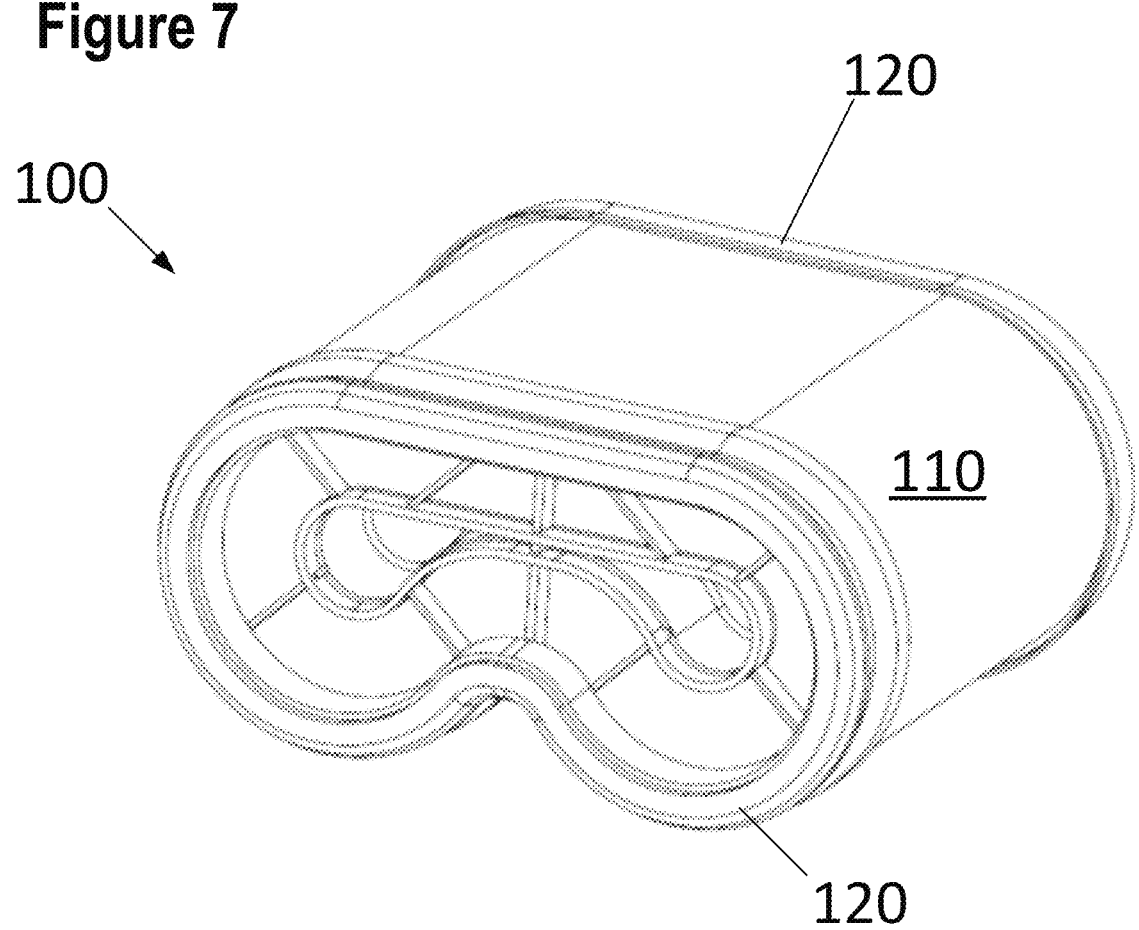
FIG. 7 presents a perspective view of a filter element according to a third embodiment of the present invention.
Figure 7A:
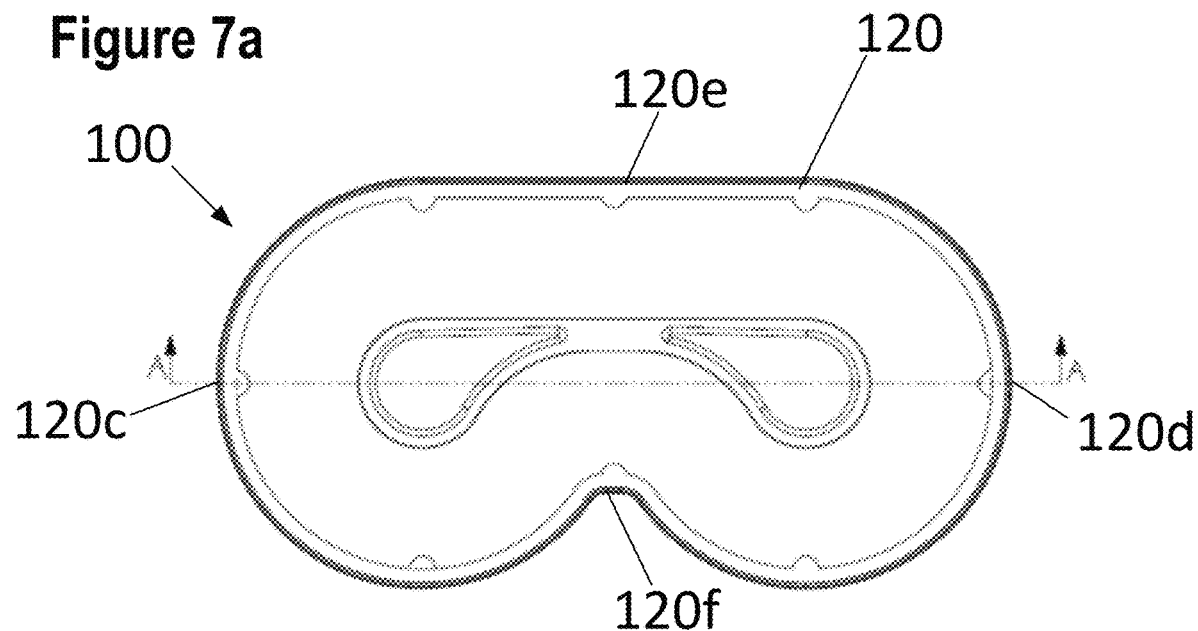
FIG. 7a presents an end view of the filter element shown in FIG. 7.
Figure 7B:
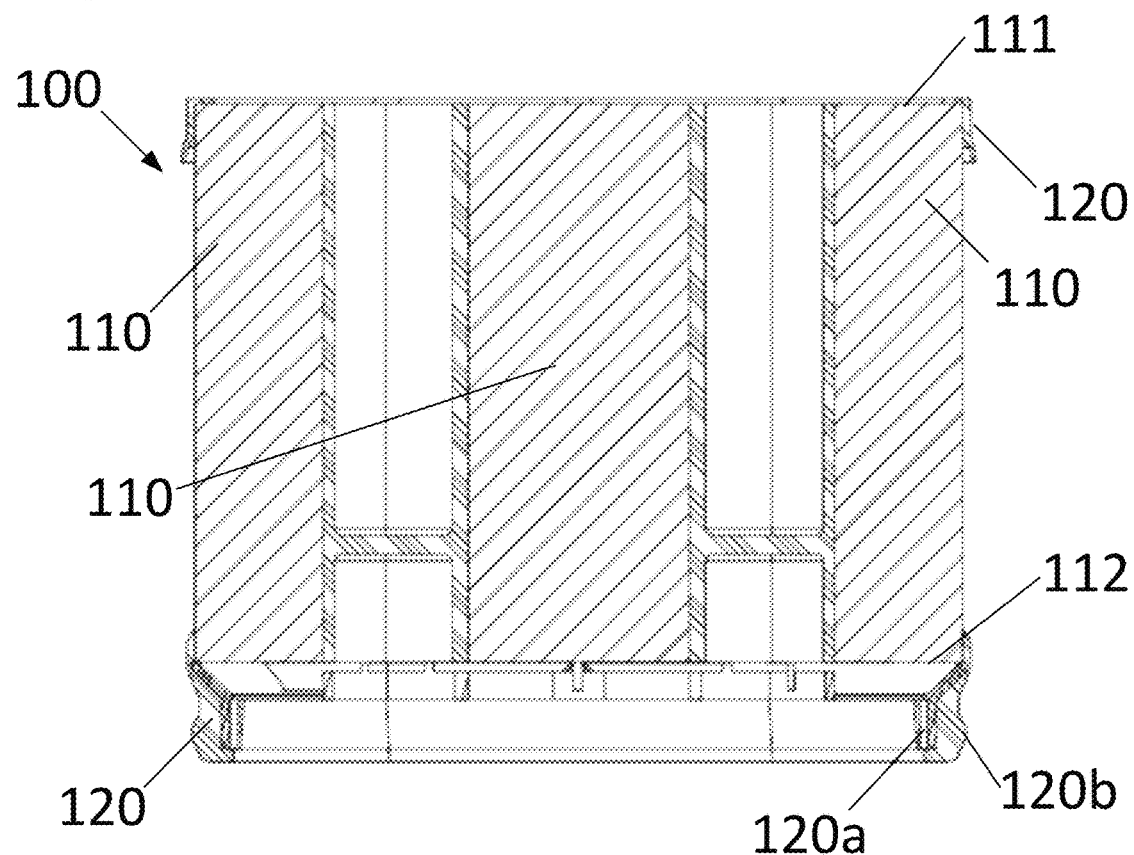

FIGS. 7-7*b* respectively present a plan view (top left), a cross section (bottom left), and a perspective view (right) of this embodiment.

The illustrated air filter element 100 comprises a filter medium pack 110 comprising a rolled-up length of filter medium. The filter medium pack 110 has a substantially planar first side 111 and a substantially planar second side 112, which are parallel to each other. The filter medium is again preferably of the "fluted filter media" type.

The air filter element 100 further comprises a guiding rim 120 arranged on at least one of said first side 111 and said second side 112. Preferably, guiding rims 120 are present on both sides 111, 112, as in the illustrated case.

In the illustrated case, the air filter element 100 has an elongate shape. The circumference of each guiding rim 120 comprises at least one convex portion and at least one concave portion. With reference to the orientation of the plan view for the present purpose, it can clearly be seen in the illustrated case that the left-hand side 120*c* and the right-hand side 120*d* of the contour are convex (viewed from the outside of the filter element) while the top side 120*e* of the contour is straight and the bottom side 120*f* of the contour comprises a concave central portion 120*f*. In the illustrated case, the contour of the filter medium pack 110 corresponds to (i.e., it closely matches) the entire circumference of the guiding rim 120.

Figure 8:
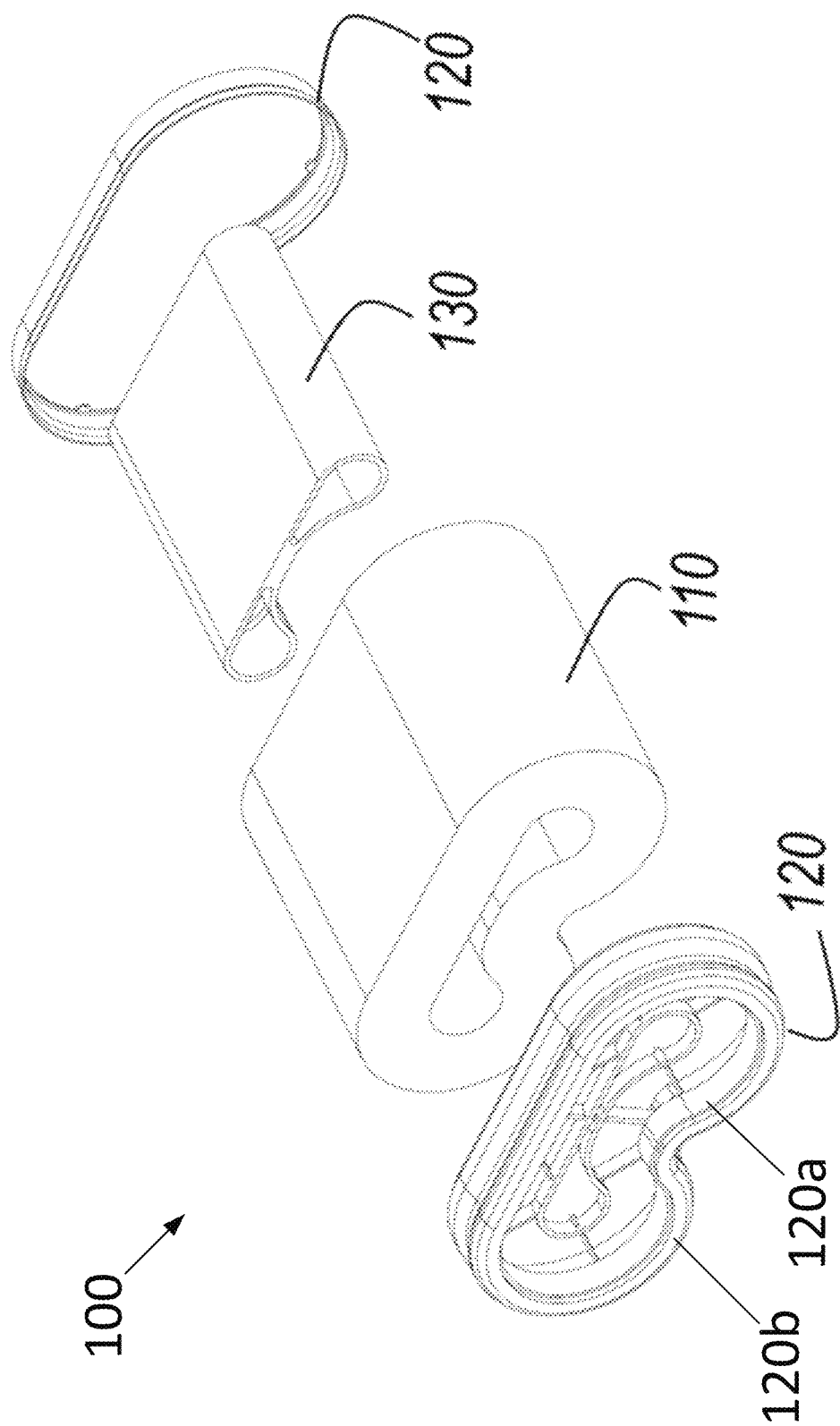
FIG. 8 presents an exploded view of the filter element according to the embodiment of FIG. 7.

FIG. 8 presents an exploded view of the filter element according to the first embodiment. The filter medium pack 110 has a tubular shape, i.e. its shape closes onto itself around a hollow center, and comprises a core 130 that is substantially geometrically similar to the outer contour of the filter medium pack 110. FIG. 8 shows the guiding rims 120 on each side of the filter medium 110 and the core 130 to be placed at the center of the filter medium 110.

A fourth embodiment of the filter element according to the present invention will now be described with reference to FIGS. 9-11. This embodiment will be described with emphasis on the elements that differ from those of the first embodiment.

Figure 9:
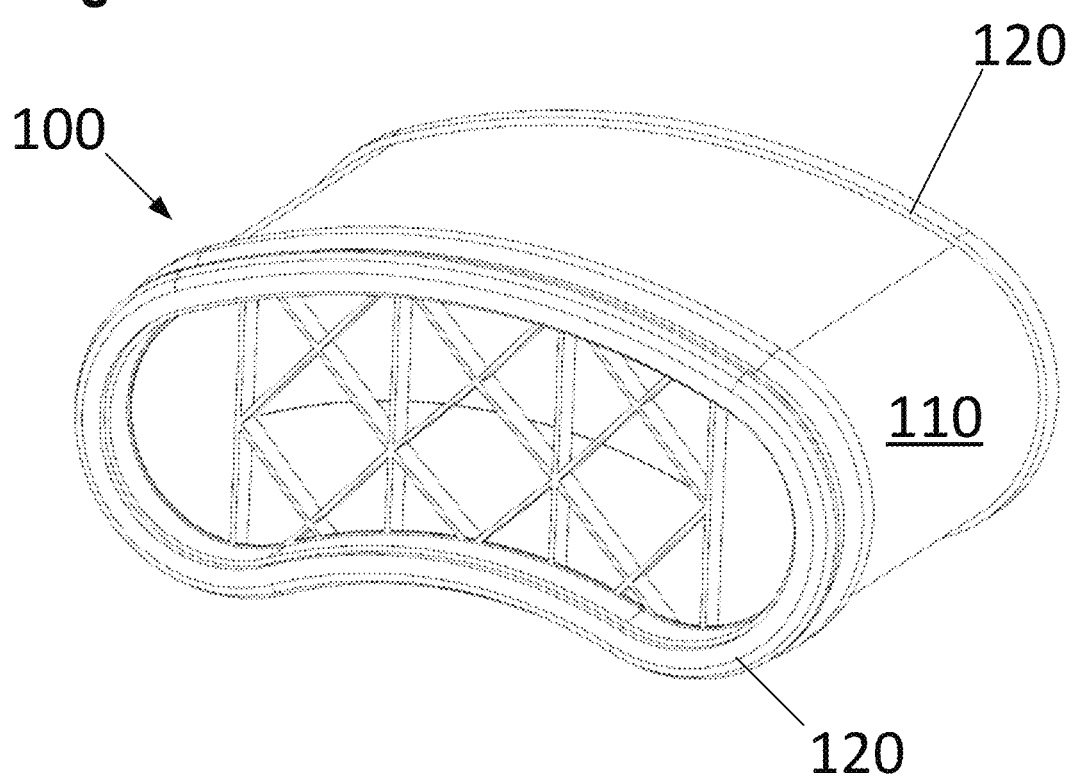
FIG. 9 presents a perspective view of a filter element according to a fourth embodiment of the present invention.
Figure 9A:
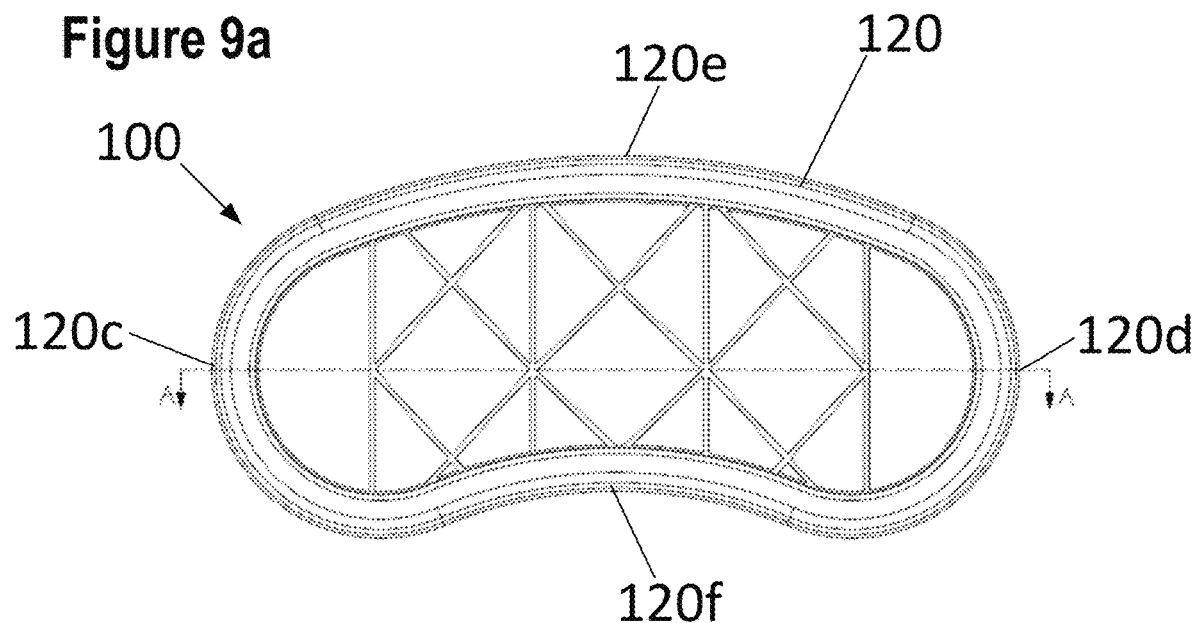
FIG. 9a presents an end view of the filter element shown in FIG. 9.
Figure 9B:
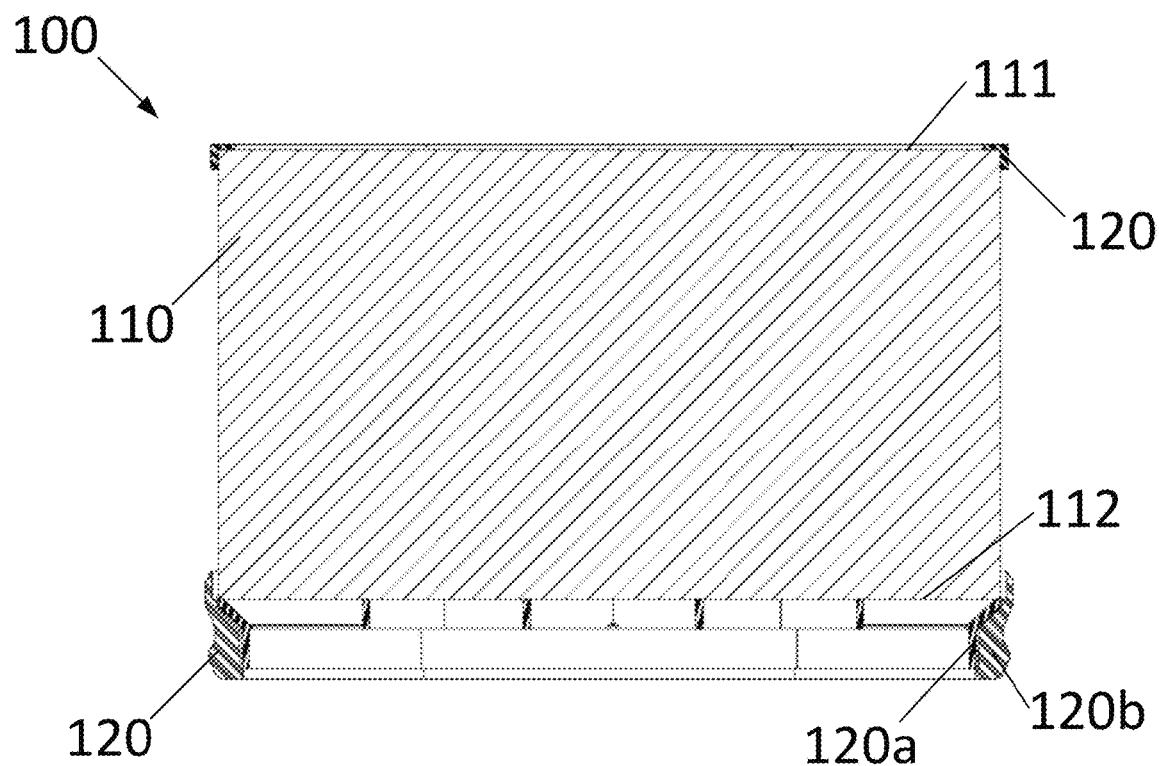

FIGS. 9-9*b* respectively present a plan view (top left), a cross section (bottom left), and a perspective view (right) of this embodiment.

The illustrated air filter element 100 comprises a filter medium pack 110 comprising a rolled-up length of filter medium. The filter medium pack 110 has a substantially planar first side 111 and a substantially planar second side 112, which are parallel to each other. The filter medium is again preferably of the "fluted filter media" type.

The air filter element 100 further comprises a guiding rim 120 arranged on at least one of said first side 111 and said second side 112. Preferably, guiding rims 120 are present on both sides 111, 112, as in the illustrated case.

In the illustrated case, the air filter element 100 has an elongate shape. The circumference of each guiding rim 120 comprises at least one convex portion and at least one concave portion. With reference to the orientation of the plan view for the present purpose, it can clearly be seen in the illustrated case that the top side 120*e*, the left-hand side 120*c*, and the right-hand side 120*d* of the contour are convex (viewed from the outside of the filter element) while the bottom side 120*f* of the contour comprises a concave central portion 120*f*. In the illustrated case, the contour of the filter medium pack 110 corresponds to (i.e., it closely matches) the entire circumference of the guiding rim 120.

Figure 10:
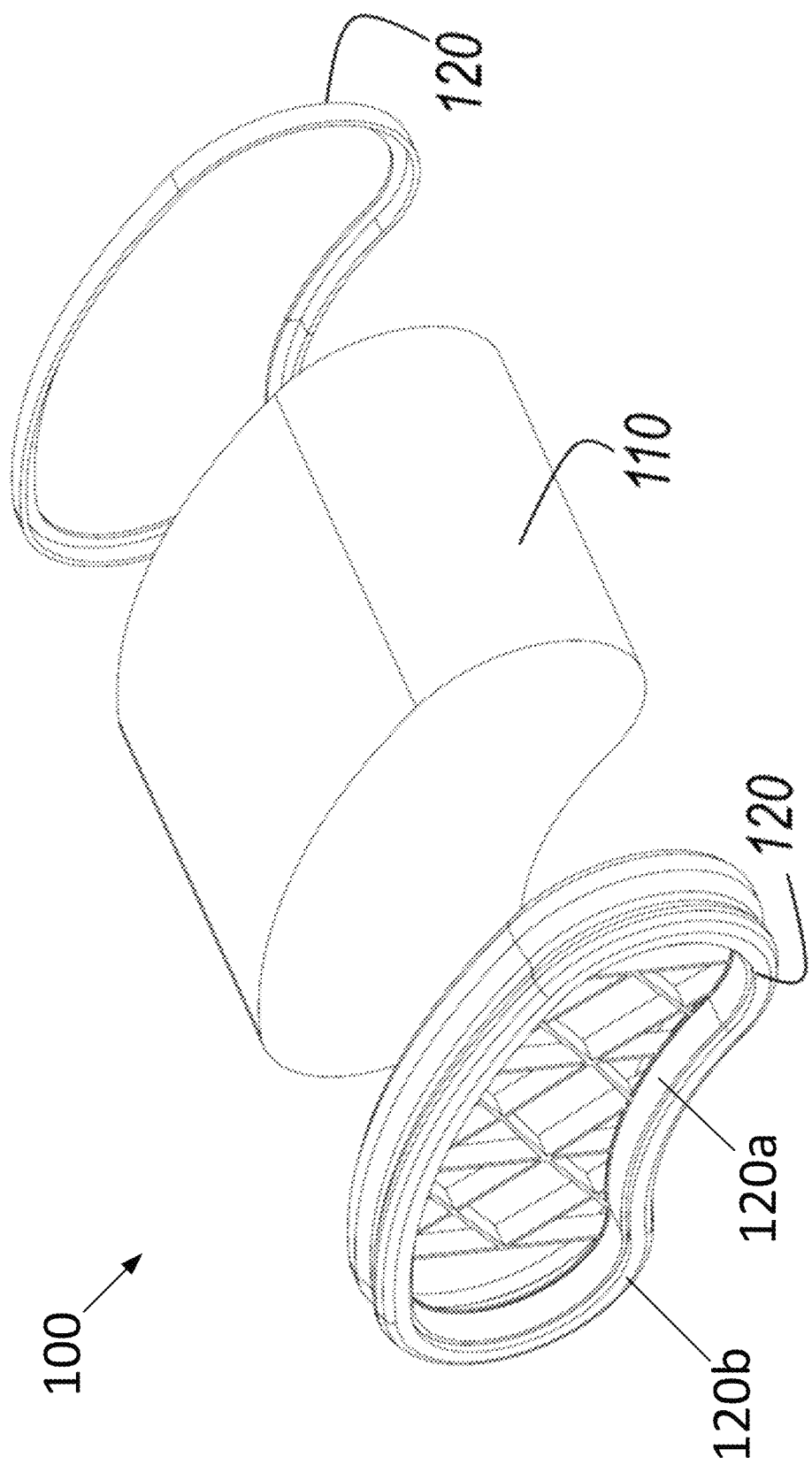
FIG. 10 presents an exploded view of the filter element according to the embodiment of FIG. 9.

FIG. 10 presents an exploded view of the filter element according to the first embodiment. The filter medium pack 110 is completely filled, i.e. it does not have a hollow center, and there is no core in this case. FIG. 10 also shows the guiding rims 120 on each side of the filter medium 110.

Figure 11:
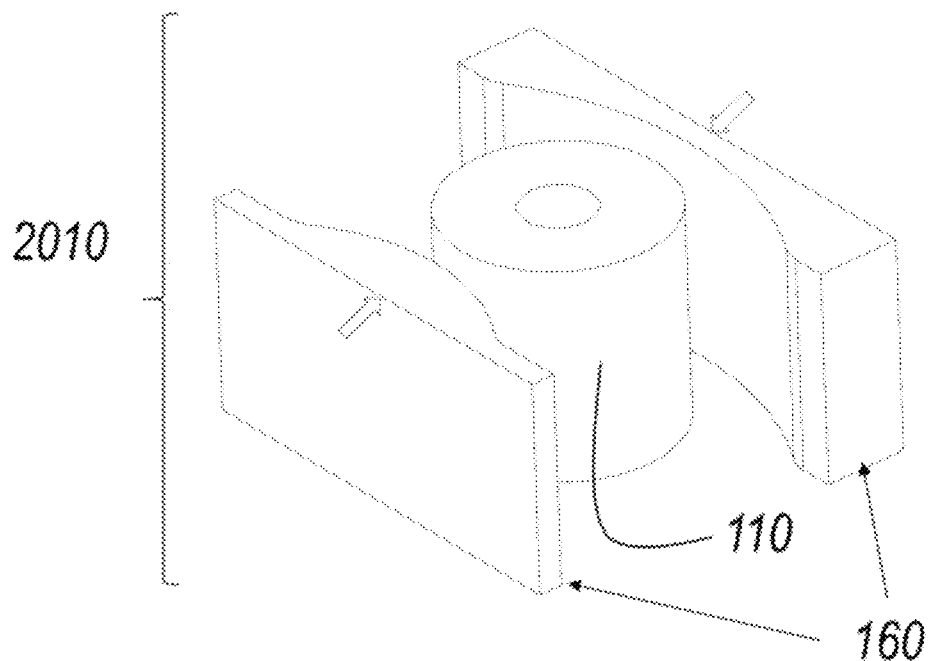
FIGS. 11-11a schematically illustrates a method of producing the filter element according to the embodiment of FIG. 10.
Figure 11A:
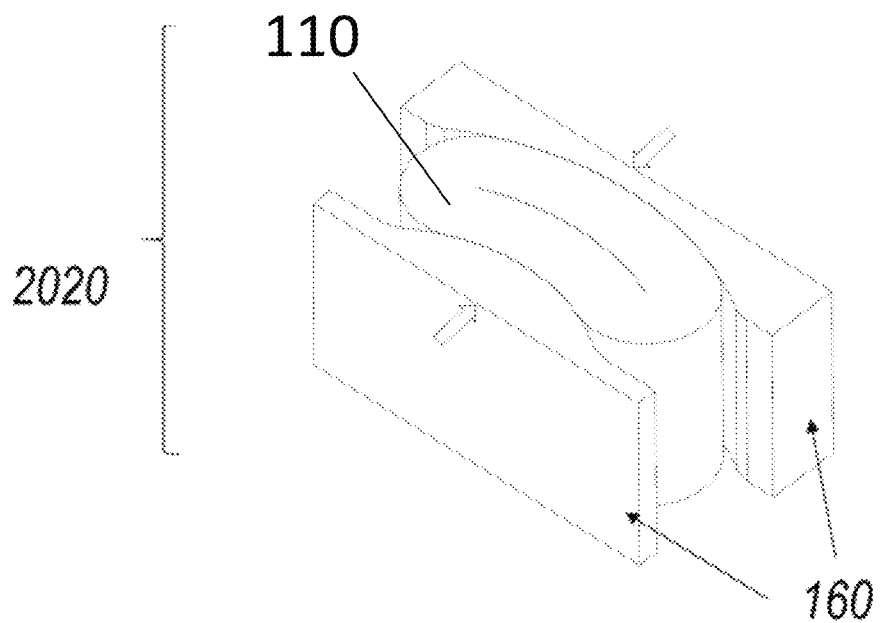

FIGS. 11-11*a* schematically illustrate a method of producing the filter element according to the fourth embodiment.

In a preliminary step (not illustrated), a length of filter medium having a constant width is rolled up around a cylindrical winding core, to produce a filter medium pack 110 with a substantially planar first side 111 and a substantially planar second side 112, the first side 111 and second side 112 being parallel. As the winding core is cylindrical, the tensioning of the filter medium sheet is less complex than in the case illustrated in FIG. 3. During the winding operation, adhesive is applied to the sheet to keep the consecutive layers together. After removal from the winding core, the resulting filter medium pack 110 has a cylindrical shape without concave portions, and a hollow center.

In a first step 2010, the filter medium pack 110 with the hollow center is placed into an appropriately shaped press-mold 160, which has protrusions and cavities corresponding to the desired shape of the contour. In a second step 2020, the press-mold 160, is closed to force the filter medium pack 110 into the desired shape. As this deformation inevitably causes some sliding of the layers of filter medium in the filter medium pack 110, this step preferably should be completed before the applied adhesive has completely cured.

In a subsequent step (not illustrated), a guiding rim 120 as described above is arranged on at least one of the first side 111 and the second side 112.

Figure 12:
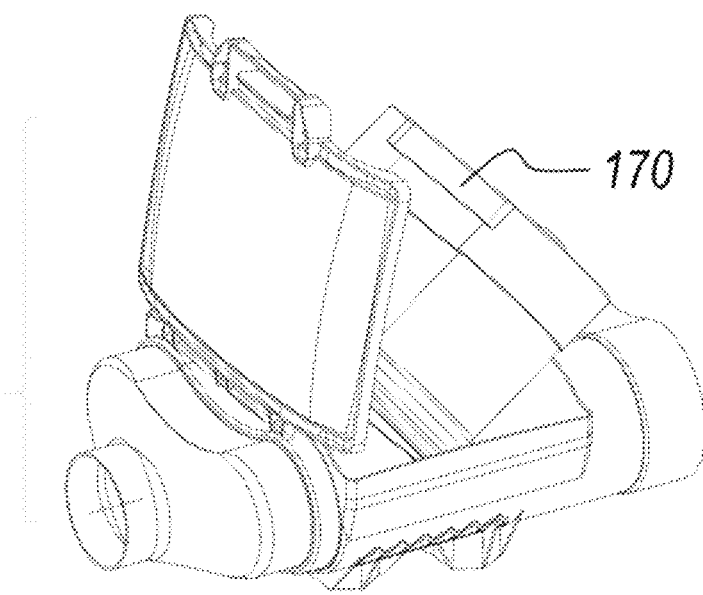
FIG. 12 presents a first perspective view of an air filter system comprising an air filter element according to an embodiment of the present invention.
Figure 12A:
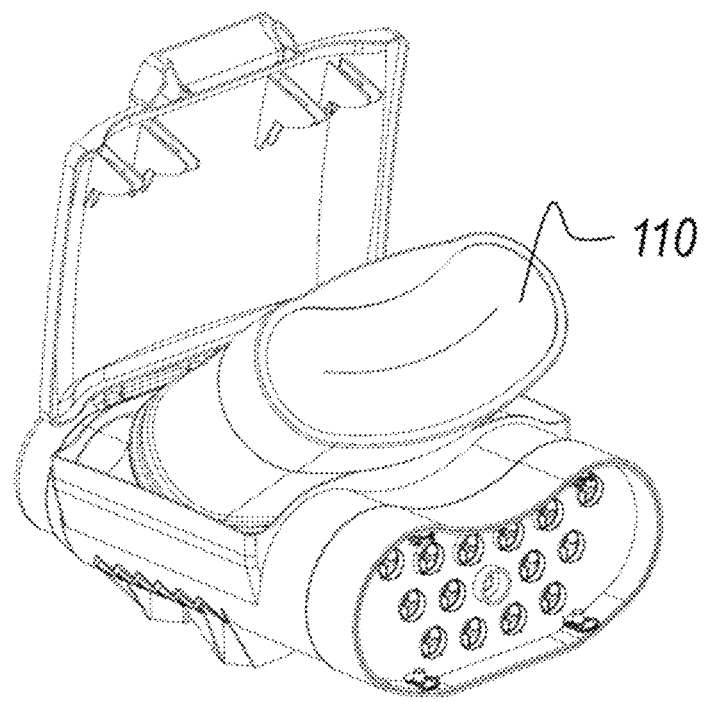
FIG. 12a presents a second perspective view of the air filter system shown in FIG. 12.
Figure 13:
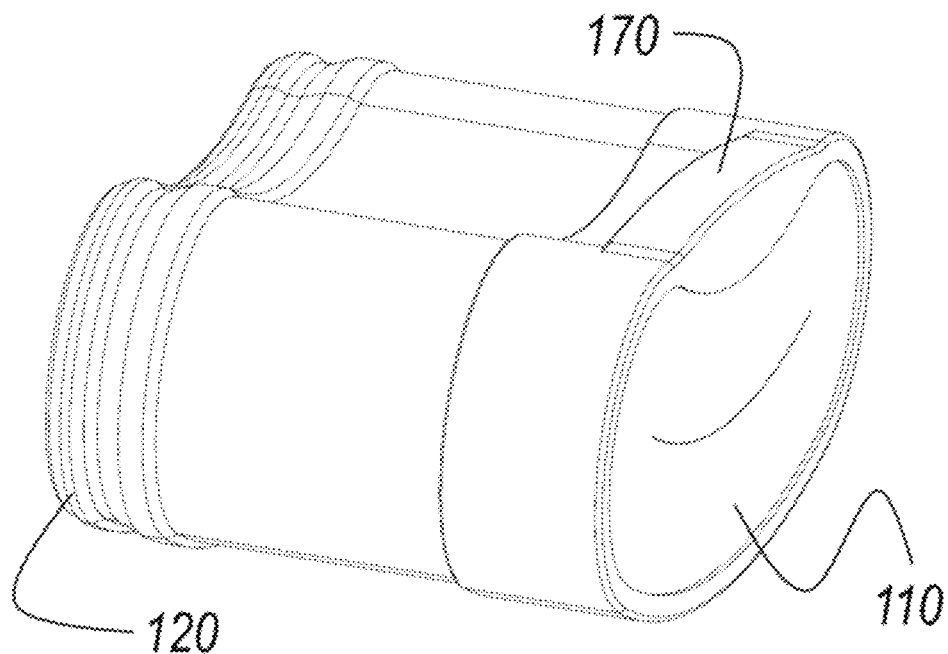
FIG. 13 presents a first perspective view of the air filter element depicted in FIG. 12.
Figure 13A:
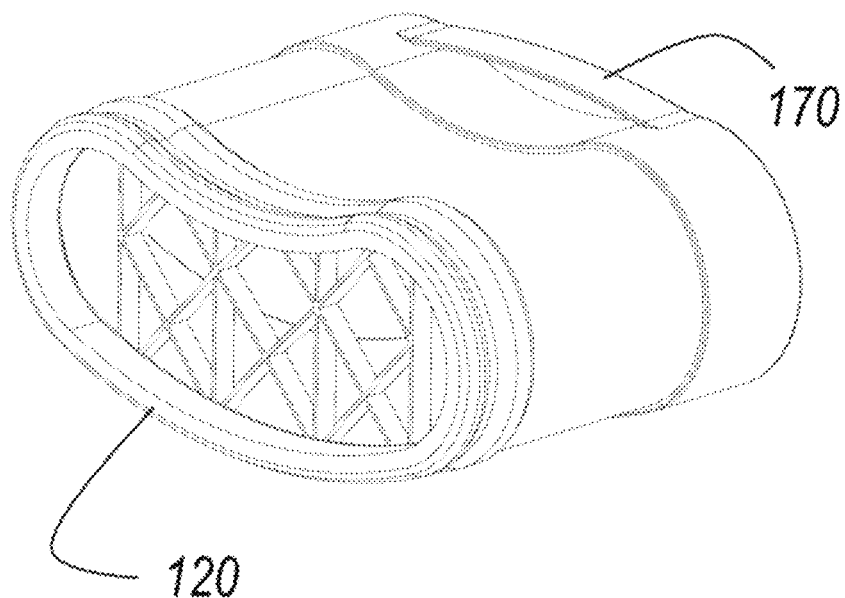
FIG. 13a presents a second perspective view of the air filter element depicted in FIG. 13.

FIGS. 12 and 12a present two perspective views of an air filter system comprising an air filter element according to an embodiment of the present invention. FIGS. 13 and 13a presents two perspective views of the air filter element of the air filter system depicted in FIGS. 12 and 12a. Without loss of generality, the air filter element illustrated in FIGS. 12, 12a and 13, 13a has a coreless kidney-shaped or bean-shaped filter media pack 110. At one end, a guiding rim 120 with a sealing surface is provided. At the other end, a handle 170 is provided across a concave portion of the contour. A handle may be obtained very simply by providing a bar or strip of material that bridges a concave portion of the contour, such that it can easily be grasped by a human operator by slipping one's fingers in the cavity behind the handle. The handle may be flexible and attached after production of the filter element. It may for instance be glued on the outer side of the media pack or on an outer protection layer thereof in a/the concave portion. Indeed, in certain embodiments of the present disclosure, a further protection layer or envelope, also called shell, of the filter medium pack can be provided surrounding its radial outer surface. The protection layer or envelope can extend over a limited distance or over the whole length of the media pack, providing a rigid or more rigid housing of the media pack. This protection layer can be made of hard material such as plastic, or for instance out of a protective cardboard. Depending on the production process, the handle can also be formed integrally with the protection envelope. The protection envelope or shell can moreover be integrally formed with the guiding rim or a support structure comprised in the guiding rim.

As indicated above, the filter medium pack preferably has a tubular shape. The term "substantially tubular" is used to cover shapes obtained by rolling a length of filter medium (with or without a core or a hollow space at the center), shapes obtained by arranging pleated filter media as a tube, and shapes obtained by combining multiple units that are substantially tubular in the aforementioned sense. The substantially tubular shape may include one or more pinches and/or bends. FIGS. 14-17 provide sketches of various substantially tubular shapes in which the filter medium pack may be arranged in embodiments of the present invention. As the purpose of the sketches is to illustrate different contours of the filter medium pack and/or the associated guiding rim, the sketches only show solid filter medium packs without a core, without loss of generality. The skilled person will appreciate that the illustrated shapes may also be obtained by combining one or more units (e.g. rolls) of filter medium with or without cores.

Figure 14:
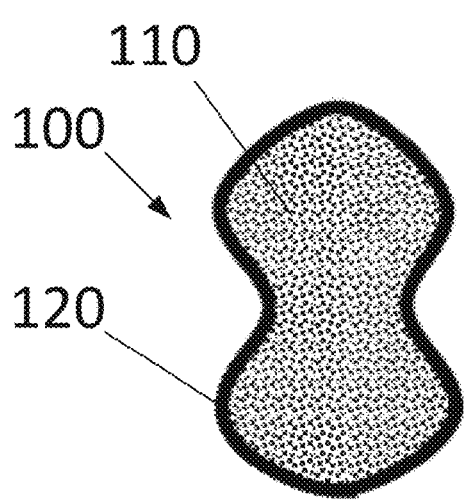
FIG. 14 is a sketch of an example of a shape of the filter medium pack as may be comprised in an embodiment of the present invention.

FIG. 14 is a sketch of an example of an air filter element 100 including a substantially tubular filter medium pack 110 and including a guiding rim 120, the shape of which may be described as an oval which has been bilaterally pinched in a direction transverse to its long axis, approximately resulting in an lemniscate, 8-shape, or "peanut" shape. As shown, the circumference of the filter medium pack 110 and the circumference of the guiding rim 120 has two concave segments or portions interconnected by two convex segments or portions.

Figure 15:
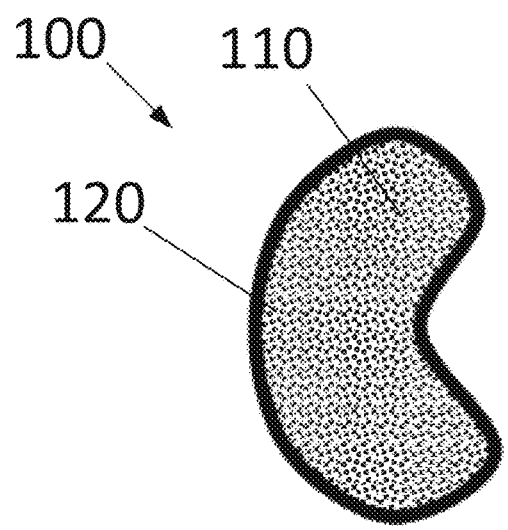
FIG. 15 is a sketch of another example of a shape of the filter medium pack as may be comprised in an embodiment of the present invention.

FIG. 15 is a sketch of an example of an air filter element 100 including a substantially tubular filter medium pack 110 and including a guiding rim 120, the shape of which may be described as an oval with a single bend. As shown, the circumference of the filter medium pack 110 and the circumference of the guiding rim 120 has one concave segment or portion interconnected by one or more convex segments or portions.

Figure 16:
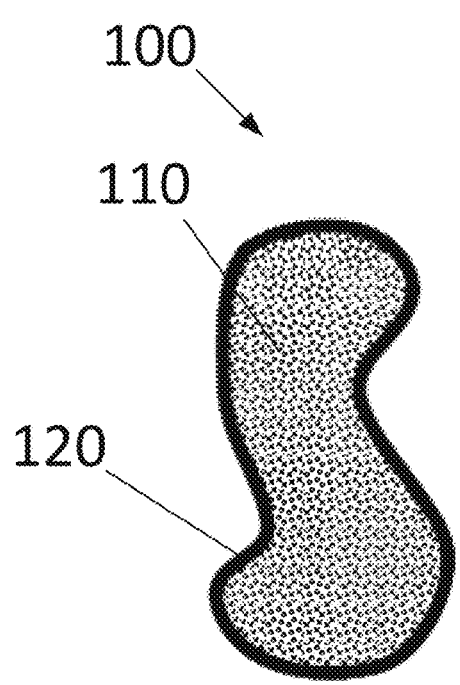
FIG. 16 is a sketch of another example of a shape of the filter medium pack as may be comprised in an embodiment of the present invention.

FIG. 16 is a sketch of an example of an air filter element 100 including a substantially tubular filter medium pack 110 and including a guiding rim 120, the shape of which may be described as an oval with two bends, approximately resulting in an S-shape (as illustrated) or Z-shape (not illustrated). As shown, the circumference of the filter medium pack 110 and the circumference of the guiding rim 120 are asymmetrically shaped with two offset concave segments or portions interconnected by two offset convex segments or portions.

Figure 17:
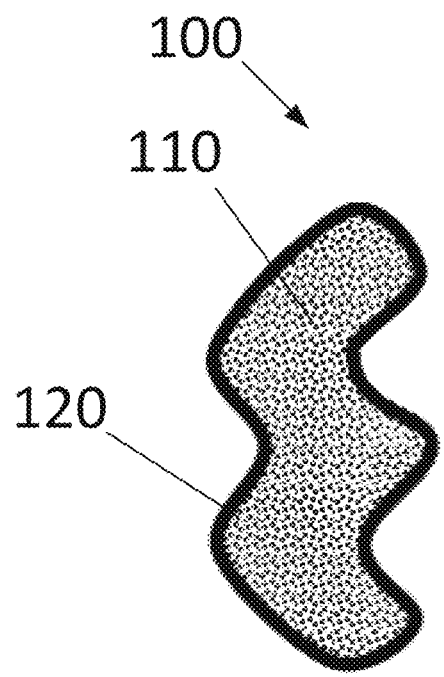
FIG. 17 is a sketch of another example of a shape of the filter medium pack as may be comprised in an embodiment of the present invention.

FIG. 17 is a sketch of an example of an air filter element 100 including a substantially tubular filter medium pack 110 and including a guiding rim 120, the shape of which may be described as an oval with three bends, approximately resulting in a W-shape. As shown, the circumference of the filter medium pack 110 and the circumference of the guiding rim 120 have three concave segments or portions interconnected by three convex segments or portions.

The skilled person will appreciate that other suitable shapes may be obtained by combining any number of "pinches" and "bends" as described above to a tubular basic shape. The pinches and bends may be arranged so as to result in symmetric or asymmetric shapes.

While the invention has been described hereinabove with reference to particular embodiments, this was done to clarify and not to limit the invention, the scope of which is to be determined by reference to the accompanying claims.

The invention claimed is:
1. An air filter element comprising:
a) a filter medium pack comprising a rolled-up length of a fluted filter medium arranged in a tubular shape, said filter medium pack having a substantially planar first flow side and a substantially planar second flow side, the first and second flow sides being parallel, the filter medium pack defining an outer perimeter having a convex portion and an adjacent concave portion;
b) a guiding rim formed from a first material and circumscribing a portion of the filter medium pack outer perimeter;
c) a sealing surface having at least a radially oriented component arranged on at least one of said first flow side and said second flow side, said sealing surface being configured to provide radial sealing when installed in a suitably shaped cavity; and
d) a core disposed within the filter medium such that the filter medium pack is without a hollow space at the center of the filter medium pack, the core being substantially geometrically similar to the filter medium pack outer perimeter; and
e) wherein a circumference of the guiding rim or sealing surface comprises at least one convex portion, corresponding to the filter medium pack outer perimeter convex portion, and at least one adjacent concave portion, corresponding to the filter medium pack outer perimeter concave portion.

2. The air filter element of claim 1, wherein said outer perimeter is elongate and wherein at least one concave portion is present along a longitudinal side of said outer perimeter.

3. The air filter element of claim 2, wherein said outer perimeter is essentially bean-shaped or kidney-shaped.

4. The air filter element of claim 1, wherein said outer perimeter is generally 8-shaped.

5. An air filter system comprising:
 a) a housing; and
 b) the air filter element of claim 1,
 c) wherein the housing defines a cavity shaped so as to be able to hold said air filter element;
 d) whereby said sealing surface provides radial sealing against said housing;
 e) wherein said housing comprises an access window for inserting said air filter element into said cavity and removing said air filter element from said cavity; and
 f) wherein said access window is shaped and positioned in such a way that said air filter element can be inserted and removed by a movement that comprises a rotation.

6. The air filter element of claim 1, wherein
 the sealing surface is provided on a seal member supported by the guiding rim.

7. The air filter element of claim 6, further including a second guiding rim mounted to the second flow side of the filter medium pack.

8. The air filter element of claim 6, wherein the first guiding rim and the filter medium pack each have two convex portions and two concave portions.

9. The air filter element of claim 6, wherein the filter medium pack has a cross-sectional shape characterized as one of a kidney-shape, a bean-shape, an 8-shape, an S-shape, and a W-shape.

10. The air filter element of claim 1, wherein the sealing surface is provided on a sealing member supported by the guiding rim, wherein the sealing member and the guiding rim are separately formed components, wherein both the sealing member and the guiding rim are substantially geometrically similar to the filter medium pack outer perimeter.

11. The air filter element of claim 10, wherein the guiding rim is formed from a first material and the sealing member is formed from a second material different from the first material.

12. The air filter element of claim 11, wherein the guiding rim is a rigid plastic material and the second material is an elastomer or polyurethane material.

13. The air filter element of claim 10, wherein the guiding rim includes a first extension circumscribing the filter medium pack outer perimeter.

14. The air filter element of claim 10, wherein a central grid portion of the guiding rim is substantially geometrically similar to the filter medium pack outer perimeter convex and concave portions.

15. An air filter element comprising:
 a) a filter medium pack comprising a rolled-up length of a fluted filter medium arranged in a tubular shape, said filter medium pack having a substantially planar first flow side and a substantially planar second flow side parallel to the first flow side, the filter medium pack defining an outer perimeter having a convex portion and an adjacent concave portion;
 b) a core disposed within the filter medium pack such that the air filter element is without a hollow space at the center of the filter medium pack, the core being substantially geometrically similar to the filter medium pack outer perimeter convex and concave portions;
 c) a guiding rim formed from a first material, the guiding rim having a grid structure supporting the filter medium pack first flow side and a first end of the core, the guiding rim having oppositely extending first and second axial extensions, wherein each of the guiding rim first axial extension, the guiding rim second axial extension, and a central portion of the grid structure are substantially geometrically similar to the filter medium pack outer perimeter convex and concave portions, the first axial extension circumscribing the filter medium pack outer perimeter convex and concave portions, the second axial extension extending beyond the filter medium pack first flow side and being radially inset from the filter medium pack outer perimeter; and
 d) a seal member formed from a second material different from the first material, the seal member being secured to the guiding rim second axial extension, the seal member being substantially geometrically similar to the filter medium pack outer perimeter convex and concave portions.

\* \* \* \* \*